US006801927B1

(12) United States Patent
Smith et al.

(10) Patent No.: US 6,801,927 B1
(45) Date of Patent: Oct. 5, 2004

(54) NETWORK ADAPTOR CARD WITH REVERSE PROXY AND CACHE AND METHOD IMPLEMENTED THEREWITH

(75) Inventors: Jack J. Smith, Saratoga, CA (US); Richard T. Burright, San Jose, CA (US); W. Spencer Worley, III, Half Moon Bay, CA (US); Eoin B. MacDonell, Sunnyvale, CA (US); John A. Vastano, Santa Clara, CA (US); William T. Weatherford, San Mateo, CA (US)

(73) Assignee: Akamba Corporation, Saratoga, CA (US)

( * ) Notice: Subject to any disclaimer, the term of this patent is extended or adjusted under 35 U.S.C. 154(b) by 624 days.

(21) Appl. No.: 09/695,724

(22) Filed: Oct. 23, 2000

Related U.S. Application Data

(63) Continuation-in-part of application No. 09/440,016, filed on Nov. 12, 1999, now Pat. No. 6,308,238, which is a continuation-in-part of application No. 09/405,608, filed on Sep. 24, 1999.

(51) Int. Cl.$^7$ .............................................. G06F 13/00
(52) U.S. Cl. ...................................... 709/202; 709/203
(58) Field of Search ............................... 709/200, 203, 709/202, 231, 249, 250, 251, 252

(56) References Cited

U.S. PATENT DOCUMENTS 5,550,981 A   8/1996 Bauer et al. ........... 395/200.06

5,642,482 A   6/1997 Pardillos ................... 395/200.2

(List continued on next page.)

FOREIGN PATENT DOCUMENTS

JP          11-149450          2/1999

OTHER PUBLICATIONS

Mogul, J. C., "The Case for Persistent–Connection HTTP," Proceedings of the Conference on Applications, Technologies, Architectures, & Protocols for Computer Comm., 1995, pp. 299–313.

(List continued on next page.)

*Primary Examiner*—Robert Harrell
(74) *Attorney, Agent, or Firm*—Henneman & Saunders; Larry E. Henneman, Jr.

(57) ABSTRACT

An adapter card for managing connections between clients and a network server off-loads the connection management burden from the server. The adapter card includes a memory with an embedded proxy application and a communication protocol stack, a processing unit for executing the application code, a network controller for interfacing with an internetwork, and a bus protocol bridge for interfacing with the internal bus of the network server. The proxy application receives client requests on behalf of the server over relatively slow and unreliable network connections, and submits the requests to the server over fast, reliable bus connections. A proxy cache provides storage for server responses, so that the proxy application can provide the stored responses to clients without re-accessing the server. Buffers are allocated to a particular client connection only after it is determined that data will be exchanged between the server and the client.

31 Claims, 19 Drawing Sheets

U.S. PATENT DOCUMENTS

| | | | |
|---|---|---|---|
| 5,678,007 A | 10/1997 | Hurvig | 395/200.12 |
| 5,754,774 A | 5/1998 | Bittinger et al. | 395/200.33 |
| 5,832,512 A | 11/1998 | Mastors et al. | 707/202 |
| 5,852,717 A | 12/1998 | Bhide et al. | 395/200.33 |
| 5,867,650 A | 2/1999 | Osterman | 395/200.33 |
| 5,867,652 A | 2/1999 | Hurvig | 395/200.33 |
| 5,872,919 A | 2/1999 | Wakeland | 395/200.6 |
| 5,896,508 A | 4/1999 | Lee | 395/200.5 |
| 5,898,830 A | 4/1999 | Wesinger, Jr. et al. | 395/187.01 |
| 5,924,116 A | 7/1999 | Aggarwal et al. | 711/122 |
| 5,935,249 A | 8/1999 | Stern et al. | 713/201 |
| 5,941,988 A | 8/1999 | Bhagwat et al. | 713/201 |
| 5,974,496 A | 10/1999 | Miller | 710/128 |
| 6,014,695 A | 1/2000 | Yamashita et al. | 709/219 |
| 6,072,483 A | 6/2000 | Rosin et al. | 345/335 |
| 6,104,716 A | 8/2000 | Crichton et al. | 370/401 |
| 6,115,755 A | 9/2000 | Krishan | 709/250 |
| 6,119,161 A | 9/2000 | Lita et al. | 709/227 |
| 6,122,514 A | 9/2000 | Spaur et al. | 455/448 |
| 6,138,162 A | 10/2000 | Pistriotto et al. | 709/229 |
| 6,182,141 B1 | 1/2001 | Blum et al. | 709/227 |

OTHER PUBLICATIONS

Cheriton, David R., "VMTP: A Transport Protocol for the Next Generation of Communication Systems," Proceeding, ACM SIGCOMM Conf. on Communications Architecture & Protocols, 1986, pp. 406–415.

Goldszmidt et al., "Scaling Internet Services by Dynamic Allocation of Connections," Integrated Network Management, 1999, Proceedings, $6^{th}$ IFIP/IEEE Int. Sym. on, pp. 171–184.

Luotonen, Ari, *Web Proxy Servers*. Prentice Hall PTR, Upper Saddle River, NJ, Copyright 1998, pp. 3–28, 325–343.

IBM TDB, "Generating Specific Server Programs in Distributed Object–Oriented Customer Information Control System," Jan.1995, vol. 38, No. 1, pp. 411–414.

Scheifler et al., "The X Window System," ACM Transactions on Graphics, vol. 5, No. 2, Apr. 1986, pp. 79–109.

Kant et al., "Server Capacity Planning for Web Traffic Workload, Knowledge and Data Engineering," IEEE Transactions on, vol. 11 No. 5, Sep.–Oct. 1999, pp. 731–747.

Lin et al., "Speech Communication for Working Group Based on LAN," Communications, 1999, APCC/OECC 1999, $5^{th}$ APC and $4^{th}$ Optoelectronics and Communications Conference, vol. 2, 1999, pp. 880–883.

Cohen et al., "Connecting Caching," Proceedings of the 31st Annual ACM Symposium on Theory of Computing, 1999, pp. 612–621.

NETWORK ADAPTOR CARD WITH REVERSE PROXY AND CACHE AND METHOD IMPLEMENTED THEREWITH

RELATED APPLICATIONS

This application is a continuation-in-part of U.S. patent application Ser. No. 09/440,016, filed Nov. 12, 1999, now U.S. Pat. No. 6,308,238.

which is a continuation-in-part of co-pending U.S. patent application Ser. No. 09/405,608, filed Sep. 24, 1999;

both applications having at least one inventor in common herewith, and being under obligation of assignment to a common assignee. The parent applications are incorporated herein by reference in their entirety.

BACKGROUND OF THE INVENTION

1. Field of the Invention

This invention relates generally to network servers and more particularly to servers that host a large number of client connections. Even more particularly, the present invention relates to servers (e.g., internet web servers) which host a large number of relatively slow client connections.

2. Description of the Background Art

It is common for network file servers such as internet web servers to host a large number of relatively slow client connections. The large number of open connections places a substantial burden on the server central processing unit (CPU), just to manage the open connections. For example, managing the open connections on a loaded server can consume 30–40% or more of the CPU's operating capacity. This burden substantially reduces the percentage of CPU cycles available to perform the primary function of the server, i.e., providing data to clients.

The connection management burden on the server CPU degrades the performance of the server software routines and reduces the maximum number of client connections that can be open at one time. As a result, web-hosting companies must provide additional, redundant servers to serve an increased number of clients. The cost of acquiring and maintaining additional web servers is substantial.

Proxy servers perform some client connection management functions, and are known in the art. However, it is well-known and commonly accepted in the art that such proxy servers must be housed separately from the server, and thus must communicate with the server over relatively slow, error prone network connections which the server must manage. See for example, Ari Luotonen, *Web Proxy Servers* (Prentice Hall, 1997), which is incorporated herein by reference.

What is needed, therefore, is a system and method for relieving the server CPU of the connection management burden, thus allowing the server to more efficiently host an increased number of clients.

SUMMARY

The present invention overcomes the problems associated with the prior art by providing a system and method for managing connections between a plurality of clients and a server. The invention facilitates off-loading the connection management burden from the host CPU to an adapter card interposed between the network and the host bus.

The adapter card includes a network controller, a memory device, a processing unit, and a protocol adapter. The memory device provides storage for data and code. The code includes a proxy application that communicates with clients on the network via the network controller, and communicates with the server via the protocol adapter, which is coupled directly to the server bus.

When executed by the processing unit, the proxy application manages client connections by establishing network connections between the proxy application and clients via the network, and by establishing bus connections between the proxy application and the server via the server bus. Additionally, the memory device provides data buffering, which allows many network connections to be open with clients, while a relatively few bus connections are open to the server. In a particular embodiment, the proxy accumulates client data in the buffers from the large number of slow client connections, and then submits the client data to the server over the fast bus connections. Conversely, the proxy receives server data via the fast bus connections, temporarily stores the server data, and then forwards the server data to the clients via the slow client connections.

In a more particular embodiment, the code includes a communications protocol stack that is employed by the application proxy to communicate with the clients and the server. In an even more particular embodiment, the communications protocol stack is a Transmission Control Protocol/Internet Protocol (TCP/IP) stack.

In one embodiment, the server connections are opened only after the proxy determines that a complete client request has been received. The server connections are then closed after the proxy receives a response to the client request from the server. Optionally, a predetermined number of persistent server connections are opened at system start-up, and the proxy uses these persistent connections to communicate with the server.

The proxy application optionally includes a number of application specific proxies, including but not limited to an HTTP proxy, a security proxy, and/or a pass-through proxy. In a particular embodiment, a master process module of the proxy discerns an application identifier (e.g., a well known port number) form the client data, and invokes one or more of the application specific proxies corresponding to the value of the identifier.

A system and method for allocating buffers is also disclosed, whereby the number of client connections that can be opened and managed by a proxy application is substantially increased. According to the method, buffers are allocated to a client connection only after it is determined that the buffer is needed to facilitate data transfer between a client and a server. One particular method includes the steps of establishing a connection with a client on behalf of a server, receiving a communication from the client, determining from the communication whether data will be exchanged between the client and the server (e.g., does the communication include a data request?), and allocating an input buffer to the client connection only if data is to be exchanged between the client and the server. Another particular method includes the steps of establishing a connection with a client on behalf of a server, receiving a communication from the client, determining whether data will be received from the server (e.g., whether a complete data request has been received from the client), and allocating an output buffer only if data is expected from the server.

A system and method for caching data from the server is also disclosed. A proxy application can then provide the cached data responsive to subsequent client requests without having to access the server again. In a particular embodiment, the system includes a network controller for communicating with clients on a network, a memory device for storing data and code, a processing unit coupled to the memory device for executing the code, a protocol adapter for providing communication between the processing unit and an internal bus of a server, and a cache memory. The code includes a proxy application that establishes network connections with clients, receives communications (e.g., data requests) from the clients via the network connection, establishes a bus connection with the server, forwards the client communication to the server via the bus connection, receives a response to the communication from the server, forwards the response to the client via the network connection, and selectively stores at least a portion of the response in the cache memory. Then, when the proxy application receives subsequent communications from clients requesting the same data, the proxy application can retrieve the data from the cache memory and transmit the data to the client, without accessing the server. Thus, the server is relieved from repeatedly receiving and responding to the same data request.

When the proxy application receives a response to a data request from the server on behalf of a client, the proxy application determines the cachability of the response before storing the response in the cache memory. The cachability of a response is determined by comparing at least a portion of the response (e.g., the protocol headers) to predetermined criteria. If the criteria are met, then the proxy application caches the response. If the cache memory is full, then the proxy application employs prioritizing routines (e.g., least-recently-used, frequency weighting, etc.) to determine which response(s) should be removed from the cache memory to make room for the new entry.

When the proxy application receives a data request from a client on behalf of the server, the proxy application determines whether the requested data is in the cache memory, and if the data is still valid. If the data is not in the cache memory, the proxy application forwards the request to the server. If the data is in the cache memory, the proxy application proceeds to determine if the data is valid. If the data is valid, the proxy application forwards the requested data to the client. If, however, the data is invalid, the proxy application removes the data from the cache memory and forwards the data request to the server.

In an exemplary embodiment, the methods of the present invention are implemented in an adapter card for coupling a server to a network.

BRIEF DESCRIPTION OF THE DRAWINGS

The present invention is described with reference to the following drawings, wherein like reference numbers denote substantially similar elements.

DETAILED DESCRIPTION

The present invention overcomes the problems associated with the prior art, by off-loading much of the connection management burden from the server's main processor with a proxy application run on a different processing unit. In the following description, numerous specific details are set forth (e.g., particular communications protocols, particular software and data structures, etc.) in order to provide a thorough understanding of the invention. Those skilled in the art will recognize, however, that the invention may be practiced apart from these specific details. In other instances, details of well known network components and programming practices (e.g., establishing connections via a communications protocol stack) have been omitted, so as not to unnecessarily obscure the present invention.

Figure 1:
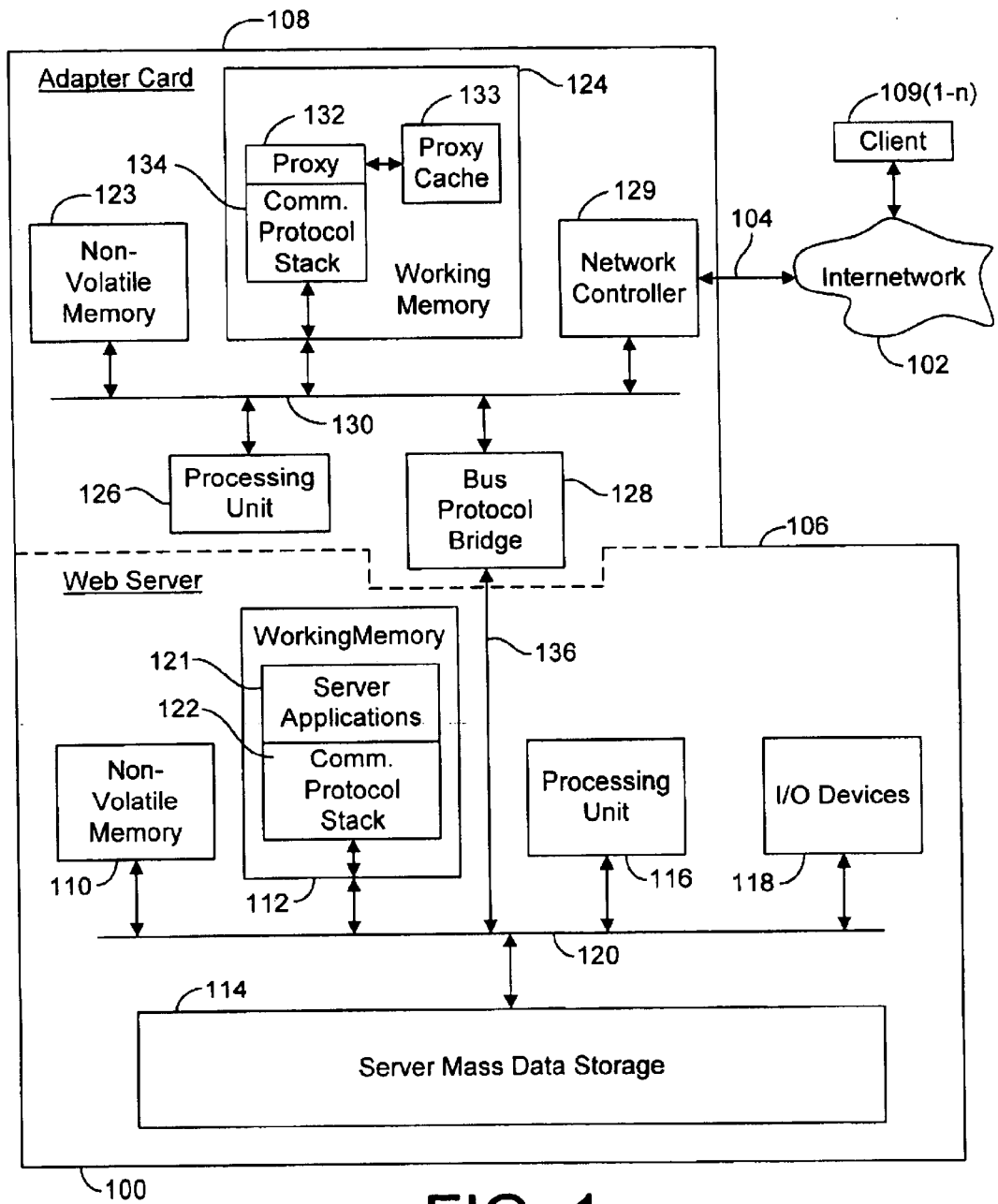
FIG. 1 is a block diagram of a server and an adapter card according to the present invention.

FIG. 1 is a block diagram showing a system 100 coupled to an internetwork 102 via a physical network media 104. In a particular implementation, system 100 is an internet web server, and internetwork 102 is the Internet, but those skilled in the art will recognize that the present invention may be implemented in any type of network server.

System 100 includes a file server (e.g., an HTTP web server) 106 and an adapter card 108. File server 106 provides data to and receives data from clients 109(1-n) on internetwork 102, via adapter card 108. Adapter card 108 establishes and maintains network connections between clients 109(1-n) and adapter card 108, and establishes bus connections between server 106 and adapter card 108. Thus connected, adapter card 108 receives communications from clients 109(1-n) on behalf of server 106, forwards the communications to server 106, receives responses from server 106 on behalf of clients 109, and forwards the responses to clients 109.

Server 106 includes non-volatile memory 110, working memory 112, server mass data storage 114, a processing unit 116, and one or more user input/output (I/O) devices 118, all intercommunicating via a server bus 120 (e.g., PCI bus). Non-volatile memory 110 (e.g., read-only memory and/or one or more hard-disk drives) provides storage for data and code which is retained even when server 106 is powered down. Working memory 112 (e.g., random access memory) provides operational memory for server 106, and includes executable code (e.g., an operating system) which is loaded into working memory 112 during start-up. Among other programs, working memory 112 includes server applications 121 and a communications protocol stack 122. Server applications 121 include network software applications (e.g., FTP, HTTP, etc.) which allow server 106 to function as a network server. Communications protocol stack 122 is a standard protocol stack (e.g., TCP/IP) which facilitates communication with other machines over an internetwork. Standard protocol stacks are well known in the art. See, for example, W. Richard Stevens, *TCP/IP Illustrated, Vol. 1* (Addison-Wesley, 1994), which is incorporated herein by reference. Server mass data storage 114 provides data storage (e.g., one or more hard disk drives) for data (e.g., HTML pages, graphics files, etc.), which the server provides to clients 109(1-n) attached to internetwork 102. Processing unit 116 executes the instructions in working memory 112 to cause server 106 to carry out its primary function (e.g., providing data to and receiving data from clients). I/O devices 118 typically include a keyboard, a monitor, and/or such other devices which facilitate user interaction with server 106. Each of the above described components is typically found in a network server such as an internet web server.

Adapter card 108 includes non-volatile memory 123, working memory 124, a processing unit 126, a bus protocol bridge 128, and a network controller 129, all intercommunicating via an adapter bus 130. Non-volatile memory 123 provides storage for data and code (e.g., boot code) which is retained even when adapter 108 is powered down. Processing unit 126 imparts functionality to adapter card 108 by executing the code present in working memory 124. Bus protocol bridge 128 provides an interface between adapter bus 130 and server bus 120, and network controller 129 provides an interface between adapter bus 130 and network media 104.

Working memory 124 provides operational memory for adapter 108, and includes a proxy application 132, a proxy cache 133, and a communications protocol stack 134. Proxy 132 and protocol stack 134 are loaded from non-volatile memory 123 into working memory 124 at start-up. Optionally, proxy 132 and protocol stack 134 can be loaded from one or more alternative sources, including but not limited to non-volatile memory 110 or server mass data storage 114 of server 106. Proxy 132, when executed by processing unit 126, establishes and manages the above described connections between adapter 108 and server 106 and between adapter 108 and clients 109.

Proxy cache 133 facilitates the caching of server responses received by proxy 132 on behalf of clients 109 (1-n), such that those responses can be provided responsive to subsequent client requests without re-accessing server 106. In addition to reducing the number of times the server must be accessed, retrieving responses from proxy cache 133 instead of server 106 is much faster, because access to on-card proxy cache 133 is not limited by the bandwidth of bus protocol bridge 128 or network controller 129. In this particular embodiment, proxy cache 133 is simply a portion of working memory 124. Those skilled in the art will recognize however that proxy cache 133 may be a implemented in a separate memory device communicating with working memory 124 via adapter bus 130.

In this particular embodiment of the invention, protocol stacks 122 and 134 are standard (e.g., TCP/IP) protocol stacks. Employing a standard communications protocol stack in adapter 108 facilitates the use of the standard communication software (e.g., protocol stack 122) already present in the vast majority of network servers. Those skilled in the art will recognize, however, that this particular element (as well as other described elements, even if not explicitly stated) is not an essential element of the present invention. For example, the present invention may be practiced with custom communication software (e.g., direct communication between server applications 121 and either protocol stack 134 or proxy 132) in both server 106 and adapter 108. Further, in particular embodiments of the invention, this element may be omitted by providing proxy 132 with direct access to the resources (e.g., server mass data storage 114) of server 106.

Adapter card 108 is coupled to server 106 via a bus connection 136 between bus protocol bridge 126 and server bus 120. In this particular embodiment, bus connection 136 is a typical bus expansion slot, for example a PCI slot. Those skilled in the art will recognize, however, that the present invention may be implemented with other types of bus connections, including but not limited to an ISA slot, a USB port, a serial port, or a parallel port. Bus connection 136 facilitates high speed, large packet size, relatively error free (as compared to network connections) communication between proxy 132 and server applications 121, greatly reducing the connection management burden on processing unit 116 of server 106. In summary, proxy 132 (running on processing unit 126) communicates with clients 109 over slow, error prone network connections, and then communicates with server applications 121 on behalf of clients 109 over high speed bus connection 136.

Figure 2:
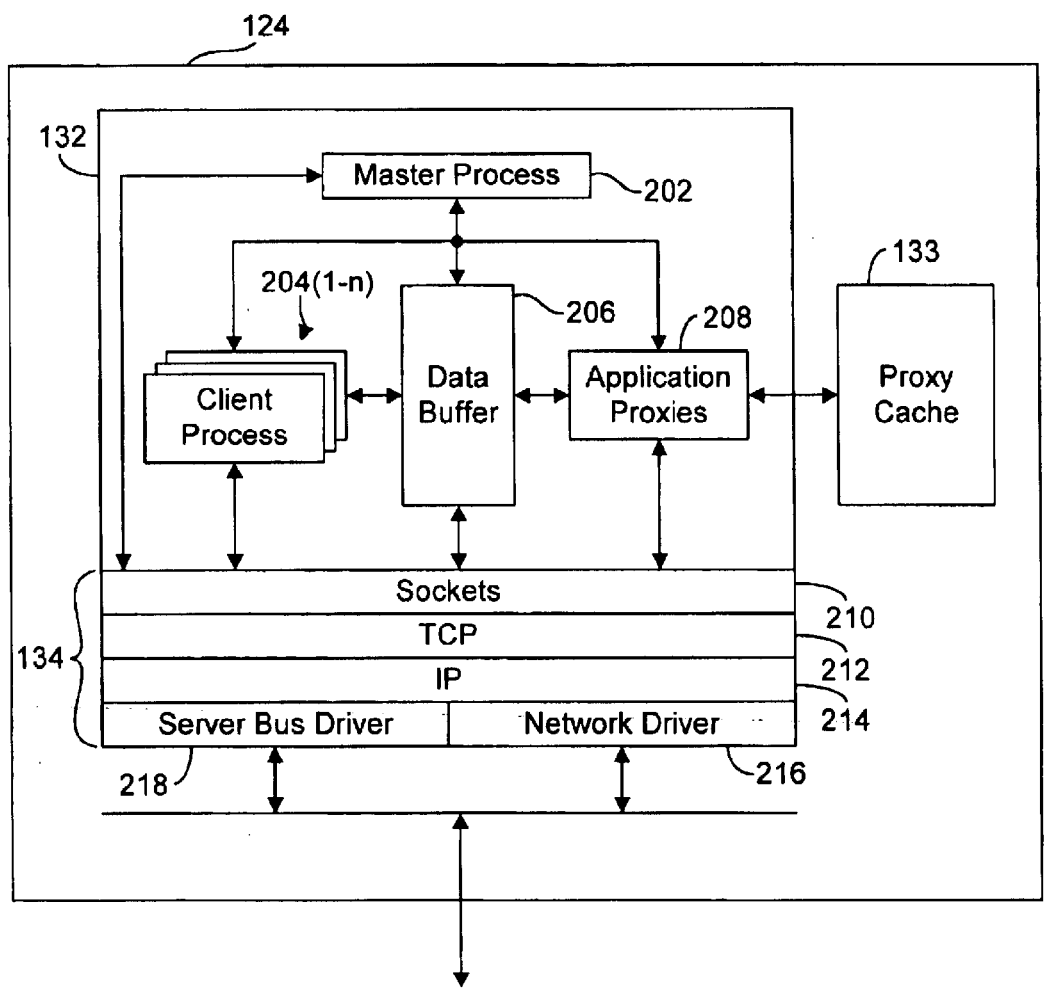
FIG. 2 is a block diagram of the working memory of the adapter card of FIG. 1, showing the proxy module in greater detail.

FIG. 2 is a block diagram of working memory 124 showing proxy 132 and protocol stack 134 in greater detail. Those skilled in the art will recognize that while the various software modules of proxy 132 are shown as interconnected functional blocks, the software modules are actually blocks of executable code stored in working memory 124 that can communicate with one another when executed by processing unit 126 (FIG. 1).

Proxy 132 includes a master process module 202, a plurality of client process modules 204(1-n), a data buffer 206, and an application proxies module 208. Master process module 202 provides overall control and coordination of the various modules of proxy 132. Responsive to a connection request from a client 109 on internetwork 102 (FIG. 1) master process 202 accepts the connection request, initializes a data structure for that client connection in data buffer 206, initiates a new, separate client connection process 204 to handle the connection, and then notifies application proxies 208 that the particular client connection has been established. Each client process 204 handles one such client connection. Application proxies 208 establish and manage bus connections with server 106, and can selectively cache server responses in proxy cache 133. Data buffer 206 provides storage for data received from clients 109 and destined for server 106, for data received from server 106 and destined for clients 109, and for connection data relating to established client and/or server connections.

Communications protocol stack 134 is a TCP/IP stack including a sockets layer 210, a TCP layer 212, an IP layer 214, and a device layer including a network driver 216 and a server bus driver 218. The functionality of each of the individual layers of protocol stack 134 is well known in the art, and will not, therefore, be discussed in detail herein. Connections between the various modules of proxy 132 and server applications 121 are established through sockets layer 210, TCP layer 212, IP layer 214 and server bus driver 218. Connections between the various modules of proxy 132 are established with clients 109 through sockets layer 210, TCP layer 212, IP layer 214 and network driver 216.

Figure 3:
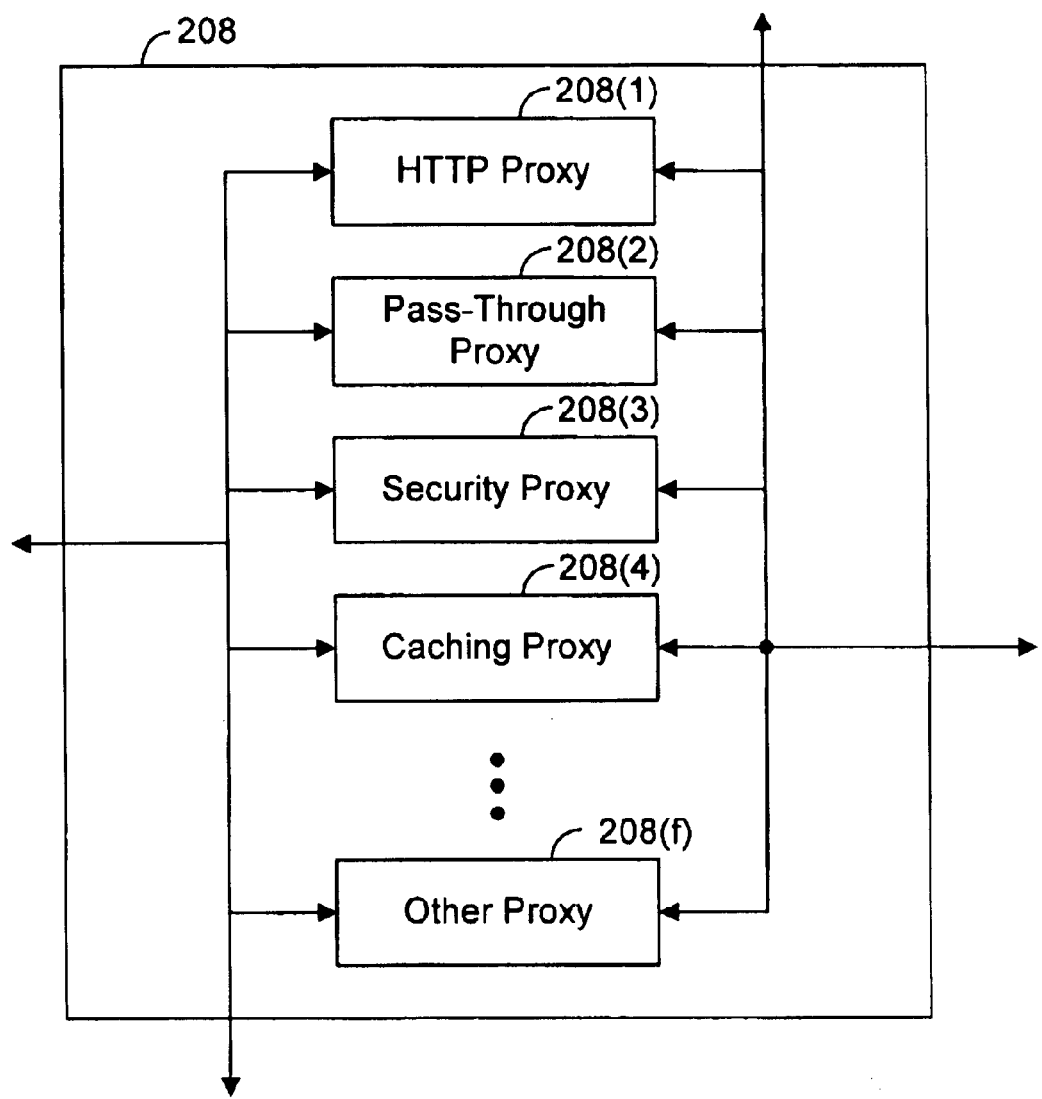
FIG. 3 is a block diagram showing the application proxies module of FIG. 2 in greater detail.

FIG. 3 is a block diagram showing application proxies module 208 to include a plurality of application specific proxies 208(1-f), including a hypertext transfer protocol (HTTP) proxy 208(1), a pass-through proxy 208(2), a security proxy 208(3), a caching proxy 208(4), and an "other" proxy 208(f). Master process 202 notifies application proxies 208 of an established client connection, by configuring one or more of the application specific proxies 208(1-f) to service the client connection. One means of configuring an application specific proxy (e.g., HTTP proxy 208(1)) is to enter a client process identifier in the processing queue of the application specific proxy.

Master process 202 determines which of the application specific proxies to implement for a particular client process from the port number included in the client connection request. It is standard practice to use well known port numbers to identify particular network applications and/or protocols (e.g., file transfer protocol (FTP), HTTP, etc.). For example, port number 80 corresponds to an HTTP connection request. Master process 202 therefore notifies HTTP proxy 208(1) of all client processes 204 initiated in response to a connection request indicating port 80.

HTTP proxy 208(1) monitors each of the client processes of which it is notified. When HTTP proxy 208(1) determines that a complete HTTP request is received and stored in data buffer 206 by a client process (e.g., 204(n)), HTTP proxy 208(1) opens a connection to the server, transmits the request to the server, receives a response from the server, stores the response in data buffer 206 and then closes the server connection. The server response is then transmitted to client 109(n) by the associated client process 204(n).

Master process 202 notifies caching proxy 208(4) of any client process that might benefit from on-card caching, and caching proxy 208(4) then monitors all of the client processes of which it is notified. Because caching may be beneficial in processing HTTP requests, caching proxy 208(4) would be notified of all of the client processes 204(1-n) that are initiated in response to a connection request indicating port 80. For example, when caching proxy 208(4) determines that a complete request has been received and stored by a client process 204, then caching proxy 208(4) checks proxy cache 133 to determine whether the response to the request has been previously stored therein. If the requested data is stored in proxy cache 133, then the data can be retrieved from proxy cache 133, instead of establishing a connection with and retrieving the requested data from server 106. Further, when caching proxy 208(4) determines that a response has been received from server 106, caching proxy 208(4) can store the data in proxy cache 133 for retrieval the next time the data is requested.

When two or more application proxies 208(1-f) are monitoring the same client processes 204(1-n), master process 202 coordinates the processing of the client processes so that the application proxies 208 don't interfere with the operations of one another. For example, once a client process 204 receives a complete request, caching proxy 208(4) should process the client process 204 before HTTP proxy 208(1). Otherwise, HTTP proxy 208(1) might unnecessarily open a connection with server 106 and forward the request, when the data could have been retrieved from proxy cache 133.

When master process 202 receives a connection request with a port number that does not correspond to any of the other application specific proxies, master process 202 notifies pass-through proxy 208(2). Pass-through proxy 208(2) simply opens a server connection, transfers the data received from the associated client process 204 from data buffer 206 to server 106, and then closes the server connection.

Master process 202 may notify some application specific proxies of all client connections, regardless of the associated port number. For example, security proxy 208(3) is operative to screen all client connection requests by, for example, terminating any client process initiated in response to a connection request lacking some indicia of authorization, prior to implementing one of the other application specific proxies. "Other" proxy 208(f) is included in FIG. 3 to show that application proxies 208 can include any currently known or future developed proxy that is desirable for a particular application, including but not limited to, caching HTTP proxy applications, electronic mail applications, and file transfer applications.

Figure 4:
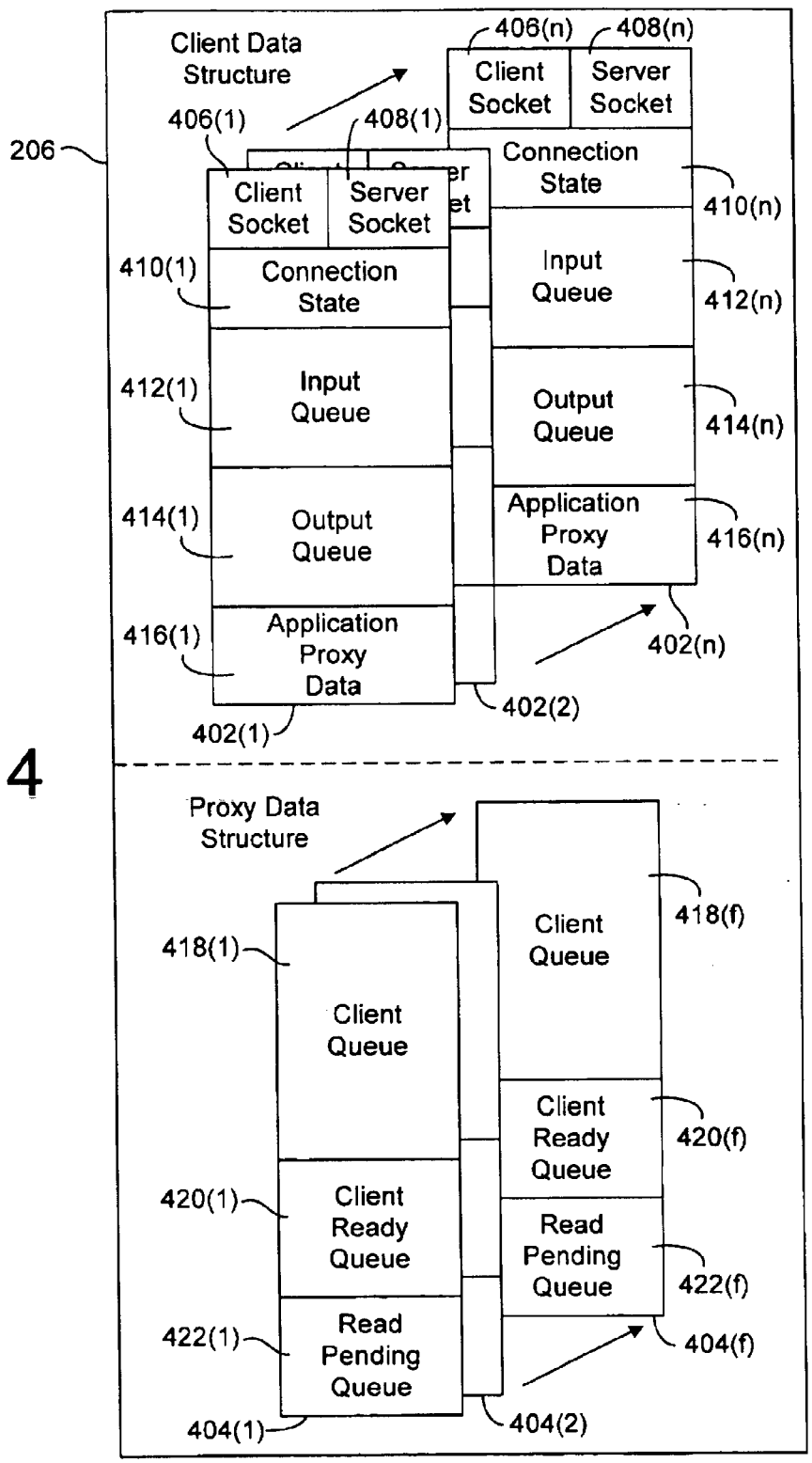
FIG. 4 is a block diagram showing exemplary data structures for at least some of the data stored in the data buffer of FIG. 2.

FIG. 4 shows an example of client data structures 402(1-n) and proxy data structures 404(1-f), implemented in data buffer 206 to effect the transfer of data through proxy 132. Master process 202 creates and initializes one client data structure 402 for each client process 204, and one proxy data structure 404 for each application specific proxy in application proxies 208.

Each client data structure 402 includes a client socket 406, a server socket 408, a connection state 410, an input queue 412, an output queue 414, and application proxy data 416. For each client connection (e.g., connection (n)), client socket 406(n) and server socket 408(n) each include the IP address and port number of the client 109(n) and server 106, respectively, thus uniquely associating each client data structure 402(n) with a single one of client processes 204(n). Connection state 410(n) indicates the current status (e.g., complete request received, response received, etc.) of the connection (n). Input queue 412(n) is used to store and accumulate data received from client 109(n) by the client process 204(n) associated with the particular data structure 402(n). Output queue 414(n) is used to store data from application proxies 208 which is to be forwarded to client 109(n) by client process 204(n). Application proxy data 416(n) is provided to store any information specific to a particular application proxy (e.g., flags, etc.).

Each proxy data structure(e.g., 404(f)) includes a client queue 418(f), a client ready queue 420(f), and a read pending queue 422(f). Client queue 418(f) includes a client process descriptor (e.g., a pointer to a related client data structure 402) for each client process 204 associated with the particular application proxy (f) to which the proxy data structure 404(f) corresponds. Client ready queue 420(f) includes a client process descriptor for each client data structure 402 that has data in its input queue 412 that is ready to be processed (e.g., transferred to server 106) by the associated application proxy (f). Read pending queue 422(f) includes the client process descriptor for each client process that is awaiting a response from server 106.

Those skilled in the art will understand that the above described client data structure 402 and proxy data structure 404 are exemplary in nature, and that other data structures may be employed with the present invention. The configuration of such alternate data structures will necessarily depend on the function and structure of the particular application specific proxies that are employed.

Figure 4A:
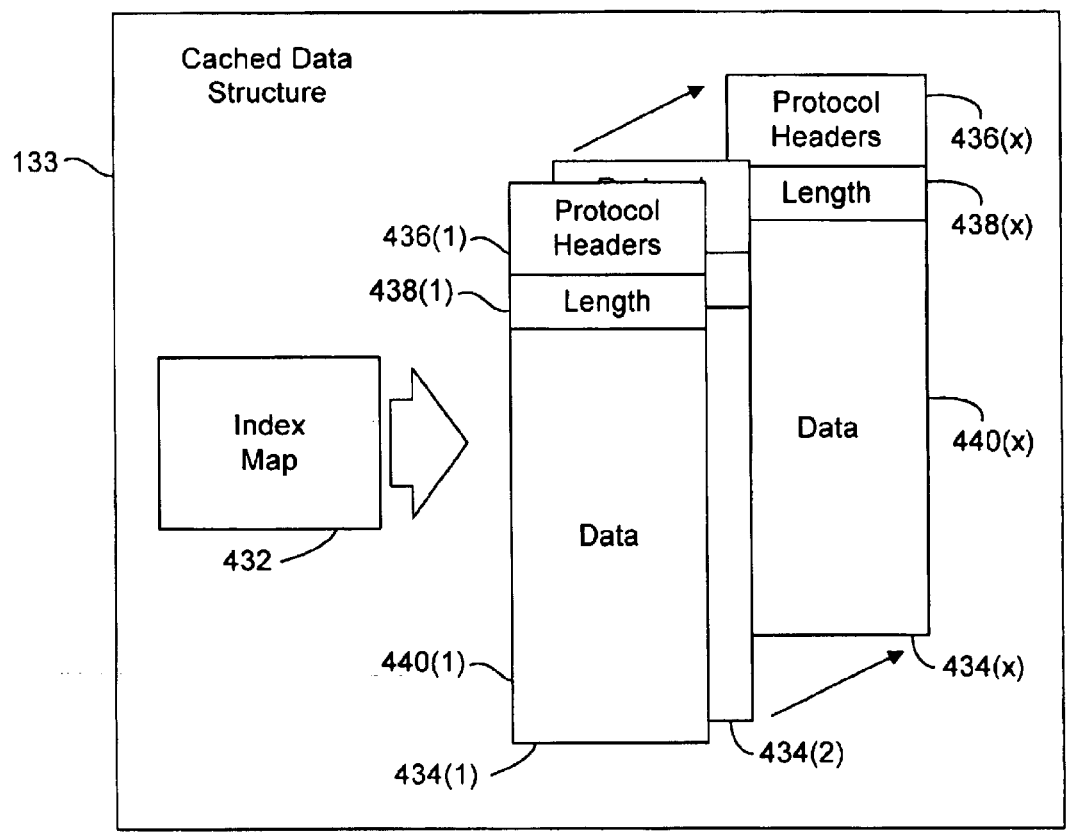
FIG. 4A is a block diagram showing an exemplary data structure for data stored in the proxy cache of FIG. 2.

FIG. 4A shows an example of a cached data structure for use in proxy cache 133. The cached data structure includes an index map 432 and a plurality of cached data records 434(1-x). Each of records 434(1-x) includes a protocol headers field 436, a length field 438, and a data field 440. Protocol headers field 436 includes the protocol headers from the server response being stored, and is used to identify the record. The length field 438 indicates the length of the record, and the data field includes the data from server 106 requested by client 109 (e.g., an HTML page). An index map 432 entry is generated by hashing on the protocol headers fields 436. The index map 432 entry associates the start address of each record 434 to a hash value, so that caching proxy 208(4) can generate a hash value from a client request, and then locate all cached records 434 corresponding to that particular hash value. Hashing is a process well known to those skilled in the art, and is not therefore, described in detail herein.

Figure 5:
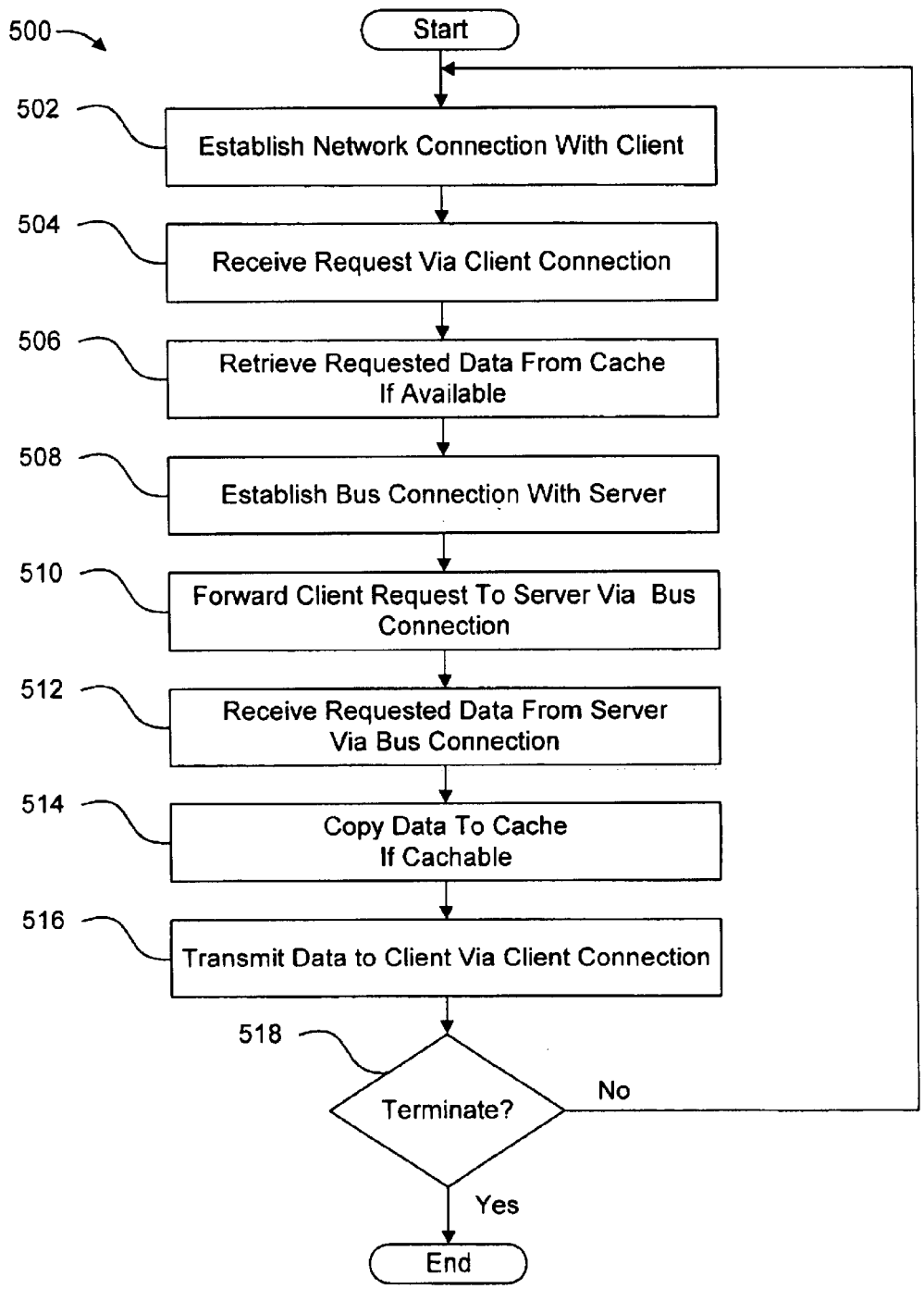
FIG. 5 is a flow chart summarizing one method for managing connections between a client and a server according to the present invention.

FIG. 5 is a flowchart summarizing a particular method 500 of managing connections between clients and a server according to the present invention. In a first step 502 proxy 132 establishes a network connection with a client 109, and then in a second step 504 receives a communication (e.g., an HTTP request) from client 109 via the network connection. Then, in a third step 506, caching proxy 208(4) retrieves the requested data from proxy cache 133 if the requested data is stored therein. If the requested data is not stored in proxy cache 133, then in a fourth step 508, proxy 132 establishes a bus connection with server 106, and then in a fifth step 510 forwards the received client communication to server 106 via the bus connection. Next, in a sixth step 512, proxy 132 receives a response (e.g., HTML data) to the client communication from server 106. Then, in a seventh step 514, caching proxy 208(4) stores a copy of the response in proxy cache 133 (if the response is cachable), and in an eighth step 516 transmits the response to client 109 via the client network connection. Finally, in a ninth step 518, proxy 132 determines whether there is a signal to terminate (e.g., shut down), and if there is a signal to terminate, then method 500 ends. If there is no signal to terminate in ninth step 518, then method 500 returns to first step 502, to establish a network connection with another client 109.

Those skilled in the art will recognize that method 500 is a method for processing several client connections simultaneously. For example, in third step 506, caching proxy 208(4) will process several client requests. For some of the client requests, the requested data will be retrieved from proxy cache 133. For other client requests, the data will not be found in proxy cache 133. Thus, while steps 508, 510, 512, and 514 are not necessary for the client requests that could be responded to from proxy cache 133, method 500 nevertheless proceeds through these steps to process the client requests for data not found in proxy cache 133.

In contrast, if method 500 was intended to process one client request at a time, then method 500 would proceed directly from third step 506 (retrieve data from cache) to eighth step 516 (transmit data to client) if the requested data was found in proxy cache 133. Otherwise, method 500 would proceed through steps 508, 510, 512, and 514, to retrieve the requested data from server 106, and possibly copy the requested data into proxy cache 133 for future use.

Figure 6:
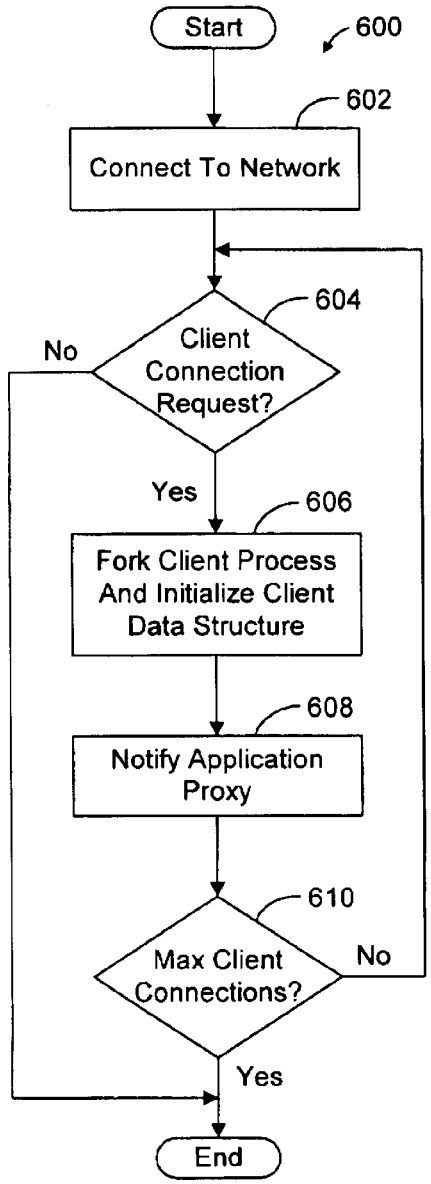
FIG. 6 is a flow chart summarizing one method for performing the first step of the method of FIG. 5.

FIG. 6 is a flow chart summarizing one particular method 600 of performing first step 502 (establishing a network connection with a client) of method 500. In a first step, master process 202 connects to internetwork 102. Then in a second step 604 master process 202 listens to the traffic on internetwork 102 to determine if there is a connection request from a client 109. If there is no client connection request, then method 600 ends. If there is a connection request from a client 109(n), then in a third step 606, master process 202 accepts the connection request form client 109(n), initiates a client process 204(n) to handle the connection, and initializes a client data structure 402(n) in data buffer 206. Next, in a fourth step 608, master process 202 discerns a proxy application identifier (e.g., a port number) from the client connection request and notifies one or more of application proxies 208(1-f), depending on the value of the identifier, by writing the client process descriptor (e.g., pointer to client data structure 402(n)) into the client queues 418 of the respective proxy data structures 404. Finally, in a fifth step 610, master process 202 determines whether the maximum allowed number of client connections are open. If the maximum number of client connections are open, then method 600 ends. If the maximum number of client connections are not open, then method 600 returns to second step 604, to listen for another connection request.

Figure 7:
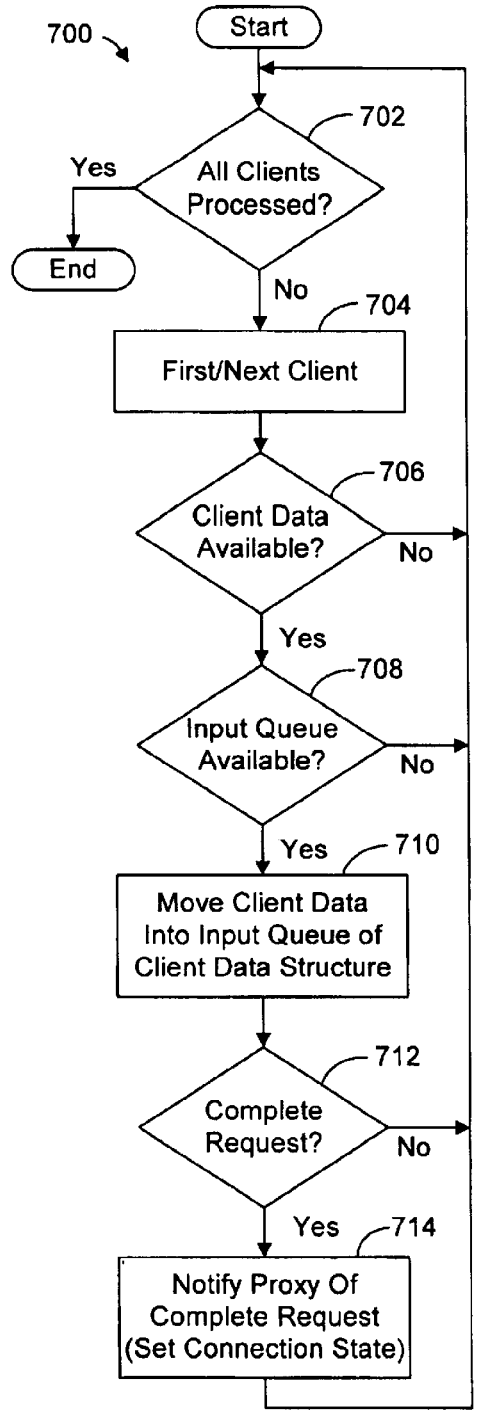
FIG. 7 is a flow chart summarizing one method for performing the second step of the method of FIG. 5.

FIG. 7 is a flow chart summarizing a method 700 of performing second step 504 (receiving a communication from a client 109) of method 500. In a first step 702, master process 202 determines whether there are any client processes 204 to be processed to receive data. If master process 202 has already processed all of client processes 204(1-n), then method 700 ends. If not, then in a second step 704, master process 202 calls the first client process 204(1). Then, in a third step 706, client process 204(1) checks its client connection (e.g., the TCP buffer) to determine whether there is any data coming in from client 109(1). If there is no incoming data for the first client process 204(1), then method 700 returns to first step 702 to process any remaining client processes 204(2-n). If, in third step 706, client process 204(1) determines that there is incoming data from client 109(1), then in a fourth step 708, client process 204(1) checks client data structure 402(1) to determine if input queue 412(1) is available to receive client data. If input queue 412(1) is not available, then method 700 returns to first step 702 to process any remaining client processes 204(2-n). If in fourth step 708, client process 204(1) determines that input queue 412(1) is available to receive data, then in a fifth step 710, client process 204(1) transfers the incoming client data into input queue 412(1). Then, in a sixth step 712, client process 204(1) determines whether the data accumulated in input queue constitutes a complete request (i.e., data ready to be transferred to server 106, for example a complete HTTP request). If the data does not constitute a complete request, then method 700 returns to first step 702 to process any remaining client processes 204(2-n). If, however, client process 204(1) determines in sixth step 712 that the data in input queue 412(1) constitutes a complete request, then, in a seventh step 714, client process notifies proxy applications 208 that there is a complete request by, for example, setting connection state 410(1) to so indicate. Then, method 700 returns to first step 702 to determine whether there are any more client processes 204(2-n) to process.

Figure 7A:
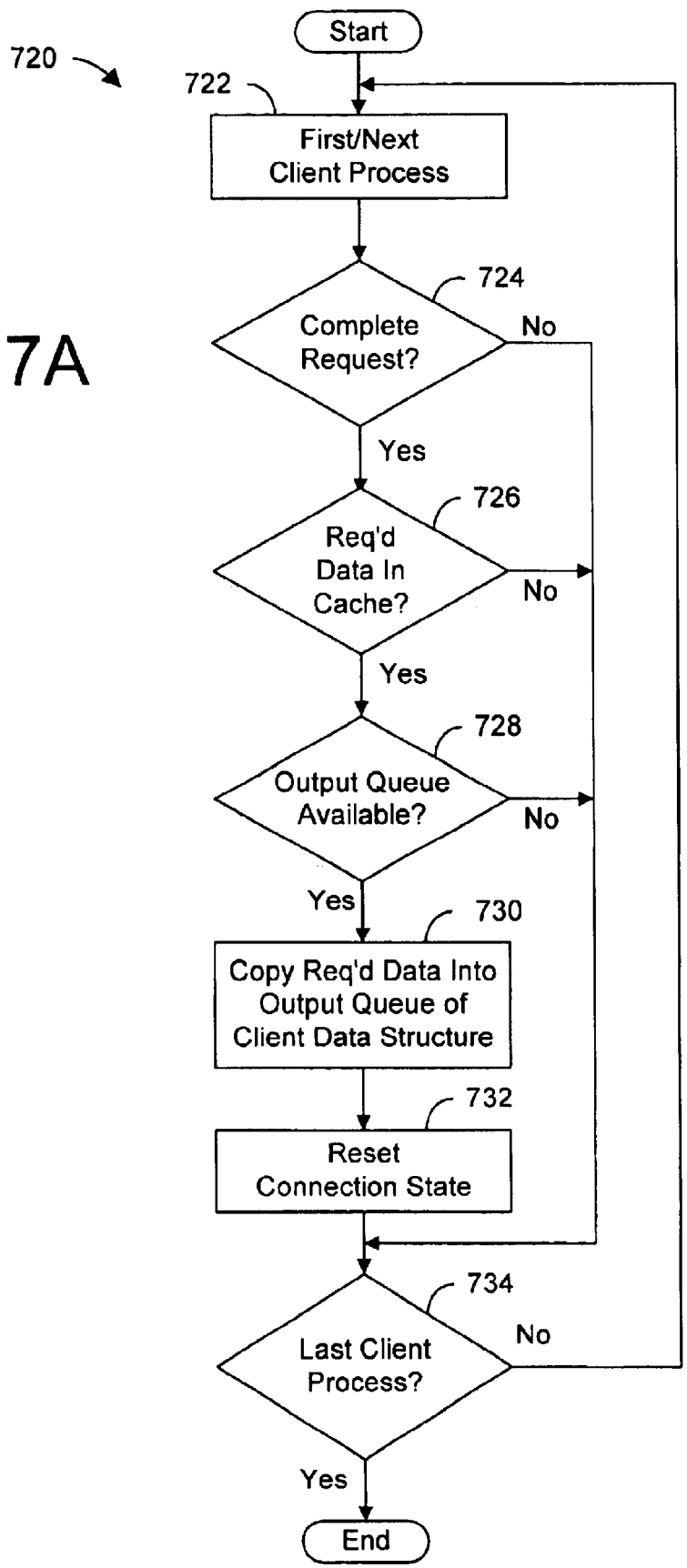
FIG. 7A is a flow chart summarizing one method for performing the third step of the FIG. 7B is a flow chart to determine if requested data is in the proxy cache.

FIG. 7A is a flow chart summarizing one particular method 720 for performing third step 506 (retrieve requested data from cache if available) of method 500. In a first step 722, master process module 202 calls caching proxy 208(4), which retrieves the first client descriptor from client queue 418(4) of its proxy data structure 404(4). Then in a second step 724, caching proxy 208(4) checks the connection state 412 of the client data structure 402 identified by the first client descriptor to determine if the first client has a complete request in its input queue 412. If connection state 412 indicates a complete request, then in a third step 726, caching proxy 208(4) determines whether the requested data is stored in proxy cache 133. If the requested data is available from proxy cache 133, then in a fourth step 728, caching proxy 208(4) checks to determine whether output queue 414 of the client data structure 402 identified by the client descriptor is available. If output queue 414 is available, then in a fifth step 730 caching proxy 208(4) copies the requested data into output queue 414 of the client data structure 402. Next, in a sixth step 732 caching proxy 208(4) removes the client request from the input queue 412 of the client data structure 402, and resets the connection state 410 so that other proxy applications 208 will not attempt to submit the client request to server 106. Next, caching proxy 208(4) checks its client queue 418(4) to determine whether the last client process has been handled. If so, then method 720 ends. Otherwise, method 720 returns to first step 722 to retrieve the next client descriptor from client queue 418(4) of its proxy data structure 404(4).

If in second step 724 caching proxy 208(4) determines from the connection state 410 of the first client data structure 402, that there is not a complete request in its input queue 412, then method 720 proceeds directly to seventh step 734 to determine whether the last client process has been processed. Similarly, if caching proxy 208(4) determines in third step 726 that the requested data is not in proxy cache 133, or determines in fourth step 728 that output queue 414 of client data structure 402 is not available, then method 720 proceeds directly to seventh step 734 to determine whether the last client process has been processed.

Figure 7B:
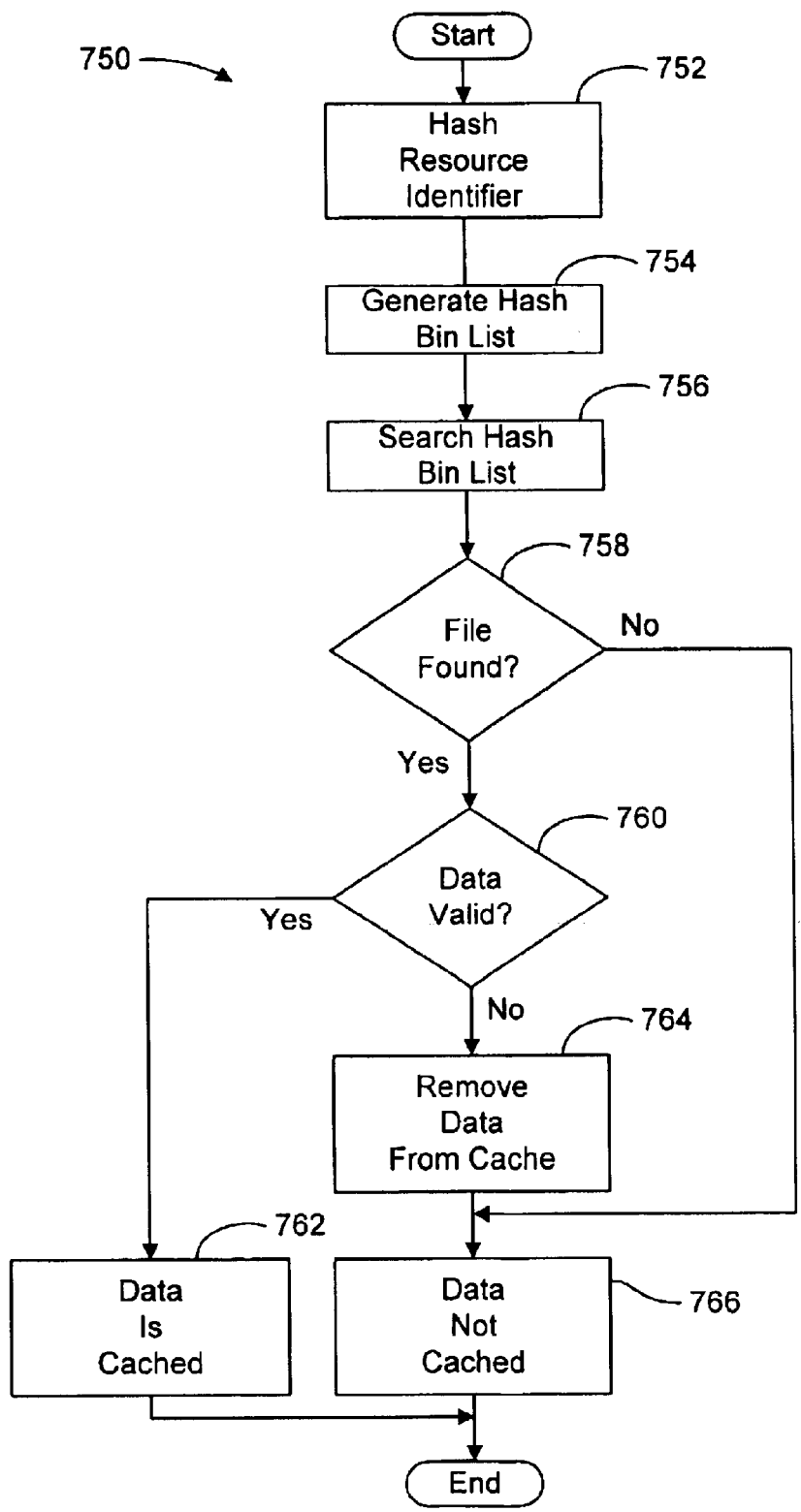

FIG. 7B is a flow chart summarizing one particular method of performing third step 726 (determining whether the requested data is in proxy cache 133) of method 720 of FIG. 7A. In a first step 752, caching proxy 208(4) hashes the resource identifier (in the protocol header of the complete data request) to obtain a hash value. Then, in a second step 754, caching proxy 208(4) determines the list of records 434 in proxy cache 133 whose hash values match the hash value generated in first step 752, and who therefore are found in the hash bin corresponding to that hash value. In a third step 756, caching proxy 208(4) searches this list of records (which may be empty if no hash match was found) to determine if one of the records is an exact match. Caching proxy 208(4) does so by iteratively retrieving the corresponding records 434 from proxy cache 133 and comparing the cached resource identifier with the request resource identifier. Next, in a fourth step 758, caching proxy 208(4) determines whether or not the requested data was found. If the requested data was found in proxy cache 133, then in a fifth step 760, caching proxy 208(4) checks the protocol headers (e.g., time stamp, etc.) to determine whether the cached data is still valid. If the cached data is still valid, then in a sixth step 762 caching proxy 208(4) determines that the requested data is in proxy cache 133. Otherwise, in a seventh step 764, the invalid data is removed from proxy cache 133, and in an eighth step 766 caching proxy 208(4) determines that the requested data is not in proxy cache 133. If in fourth step 758, caching proxy 208(4) determines that the requested data was not found in proxy cache 133, then method 750 proceeds directly to eighth step 766 and determines that the requested data is not in proxy cache 133.

Figure 8:
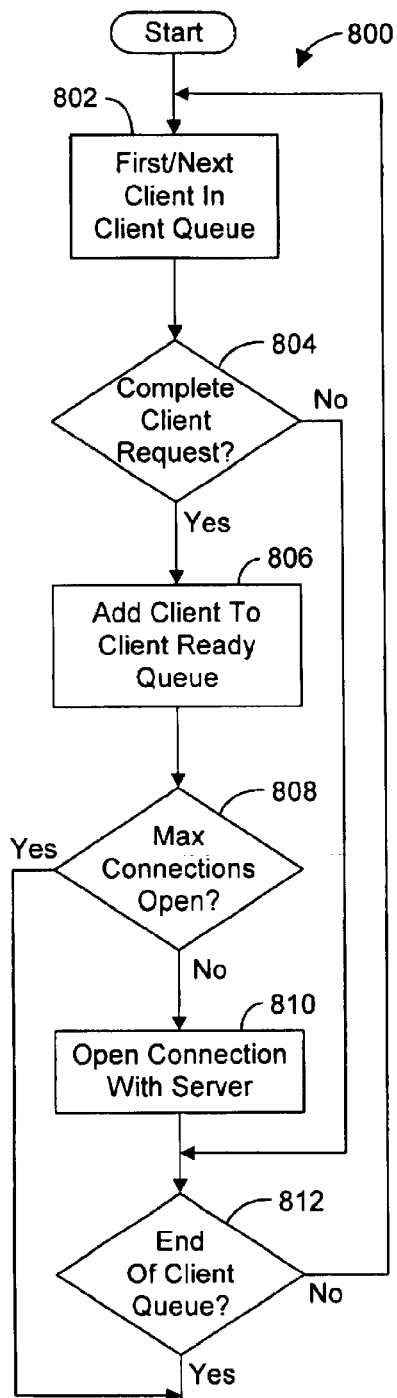
FIG. 8 is a flow chart summarizing one method for performing the step of the method of FIG. 5.

FIG. 8 is a flow chart summarizing a method 800 of performing fourth step 508 (establishing a bus connection with server 106) of method 500. In a first step 802, a first one of application proxies 208(1) retrieves the first client descriptor from client queue 418(1) of its proxy data structure 404(1). Then in a second step 804, proxy 208(1) checks the connection state 410 of the client data structure 402 identified by the first client descriptor to determine if the first client has a complete request in its input queue 412. If connection state 412 indicates a complete request, then in a third step 806, proxy 208(1) adds the client descriptor to its client ready queue 420(1). Next, in a fourth step 808, proxy 208(1) determines whether the maximum number of connections to server 106 are open. If the maximum number of server connections are already open, then method 800 ends. If the maximum number of server connections are not already opened, then in a fifth step 810, proxy 208(1) opens a bus connection with server 106 and writes connection information in server socket 408 of the associated client data structure 402. Next, in a sixth step 812, proxy 208(1) determines whether it has checked the last client descriptor in its client queue 418(1). If the last descriptor has been checked, then method 800 ends. Otherwise, method 800 returns to first step 802 to retrieve the next descriptor in client queue 418(1). If, in second step 804, proxy 208(1) determines that a complete client request has not been received, then method 800 proceeds directly to sixth step 812. Once all of the descriptors in client queue 418(1) of proxy data structure 404(1) have been processed, method 800, or a similar method, is repeated for each of the other application proxies 208(2-f). As indicated above, however, master process 202 can call application proxies 208(1-f) in any order (e.g., calling caching proxy 208(4) first) to avoid conflicts between the operations of the various application proxies 208(1-f).

Figure 9:
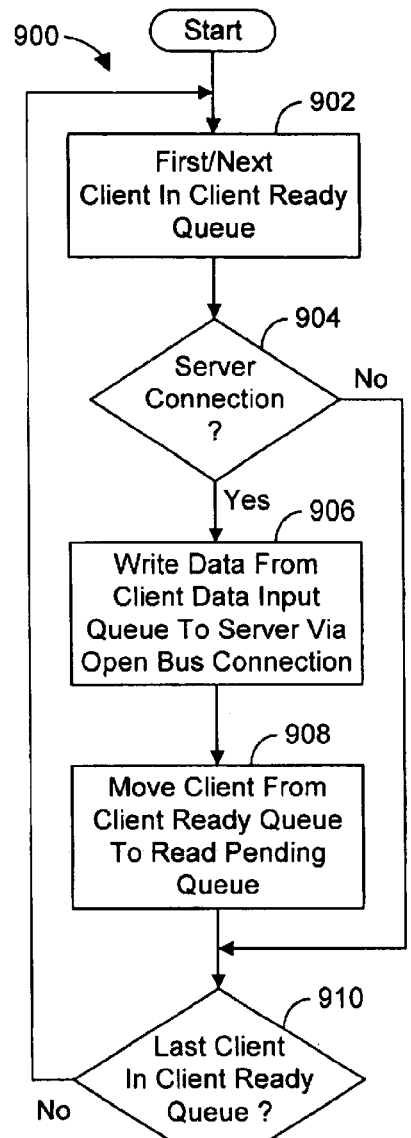
FIG. 9 is a flow chart summarizing one method for performing the fifth step of the method of FIG. 5.

FIG. 9 is a flow chart summarizing a method 900 of performing fifth step 510 (forwarding a client communication to server 106) of method 500. In a first step 902, proxy 208(1) retrieves the first client descriptor from the client ready queue 420(1) of its proxy data structure 404(1). Then, in a second step 904, proxy 208(1) checks the server socket 408 of the first client's data structure 402 to determine whether a server connection is open. If a server connection is open, then in a third step 906, proxy 208(1) transfers the client data (e.g., HTTP request) from the client input queue 412 to server 106 over the open server connection. Next, in a fourth step 908, proxy 208(1) moves the client descriptor from the client ready queue 420(1) to the read pending queue 422(1). Then in a fifth step 910, proxy 208(1) determines whether the last client in the client ready queue 420(1) has been checked. If not, then method 900 returns to first step 902 to check the next client in client ready queue 420(1). If the last client has been checked, then method 900 ends. If, in second step 904, proxy 208(1) determines that there is no server connection open for a particular client, then method 900 proceeds directly to fifth step 910 to determine whether the last client in the client ready queue 420(1) has been checked. Once all of the descriptors in client ready queue 420(1) of proxy data structure 404(1) have been processed, method 900, or a similar method, is repeated for each of the other application proxies 208(2-f).

Figure 10:
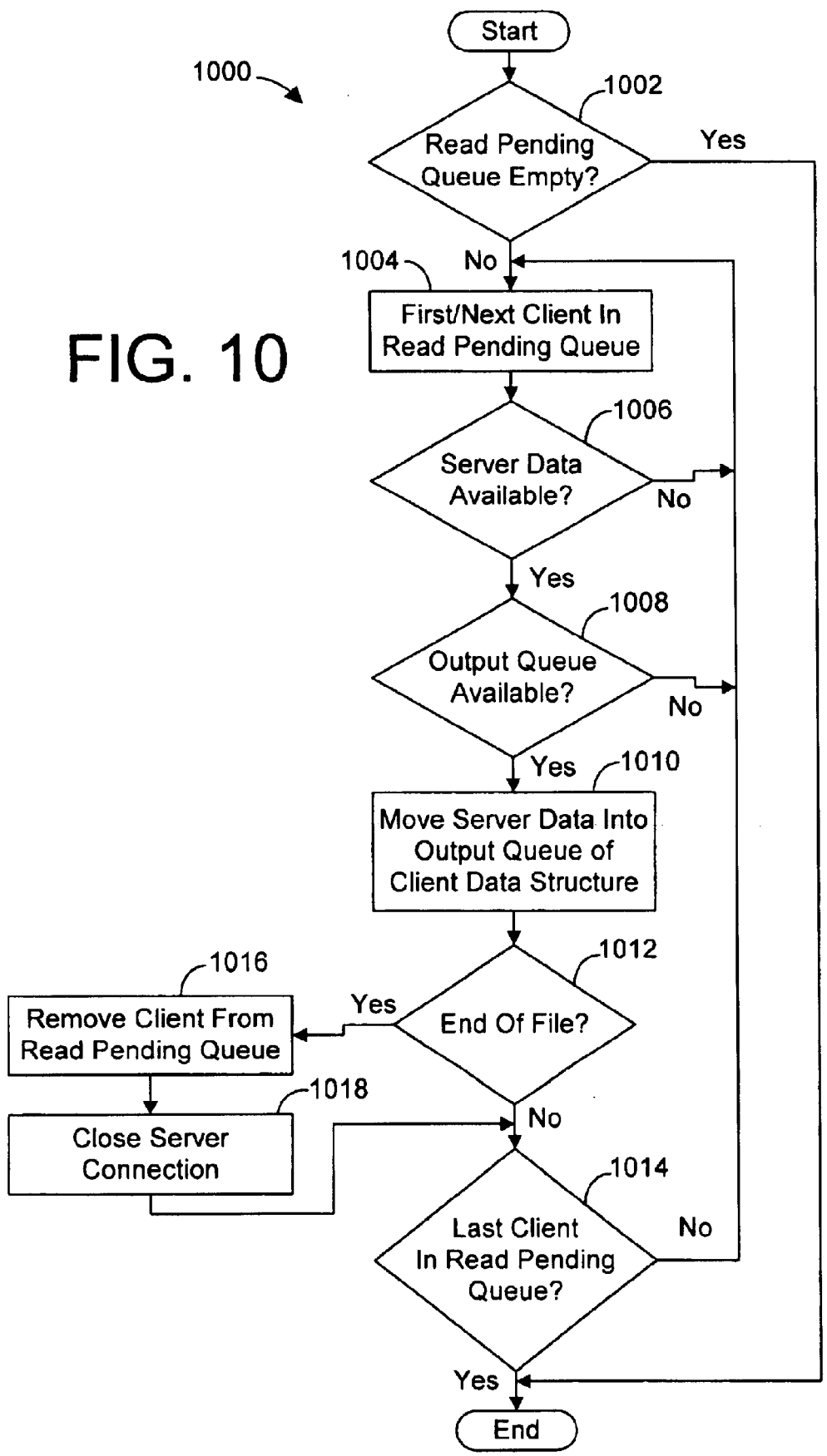
FIG. 10 is a flow chart summarizing one method for performing the sixth step of the method of FIG. 5.

FIG. 10 is a flow chart summarizing a method 1000 of performing sixth step 512 (receive a response from server 106) of method 500. In a first step 1002, proxy 208(1) determines whether read pending queue 422(1) is empty, and if so method 1000 ends. If read pending queue 422(1) is not empty, then in a second step 1004 proxy 208(1) retrieves the first client descriptor from the read pending queue. Next, in a third step 1006, proxy 208(1) checks the open server connection identified in server socket 408 of the client data structure 402 identified by the first client descriptor, to determine whether there is any incoming server data (i.e., a response to the client request) on that connection. If there is no incoming server data on that connection, then method 1000 returns to second step 1004 to check the next client in the read pending queue. If there is incoming server data, then in a fourth step 1008, proxy 208(1) checks to determine whether output queue 414 of the client data structure 402 identified by the client descriptor is available. If output queue 414 is not available, then method 1000 returns to second step 1004 to check the next client descriptor in read pending queue 422(1). If output queue 414 is available, then, in a fifth step 1010, proxy 208(1) moves the incoming server data into the output queue 414 of client data structure 402. Next, in a sixth step 1012, proxy 208(1) determines whether the server data includes an "end of file" indicator. If not, then in a seventh step 1014, proxy 208(1) checks to determine whether the last client descriptor in read pending queue 422(1) has been processed. If so, method 1000 ends. If not, method 1000 returns to step 1004 to read the next client descriptor from read pending queue 422(1).

If, in sixth step 1012, proxy 208(1) determines that the server data includes an end-of-file indicator, then method 1000 proceeds to an eighth step 1016, wherein proxy 208(1) removes the client descriptor from the read pending queue, and then in a ninth step 1018 closes the server connection. After ninth step 1018, method 1000 returns to seventh step 1014. Once all of the descriptors in read pending queue 422(1) of proxy data structure 404(1) have been processed, method 1000, or a similar method, is repeated for each of the other application proxies 208(2-f).

Figure 10A:
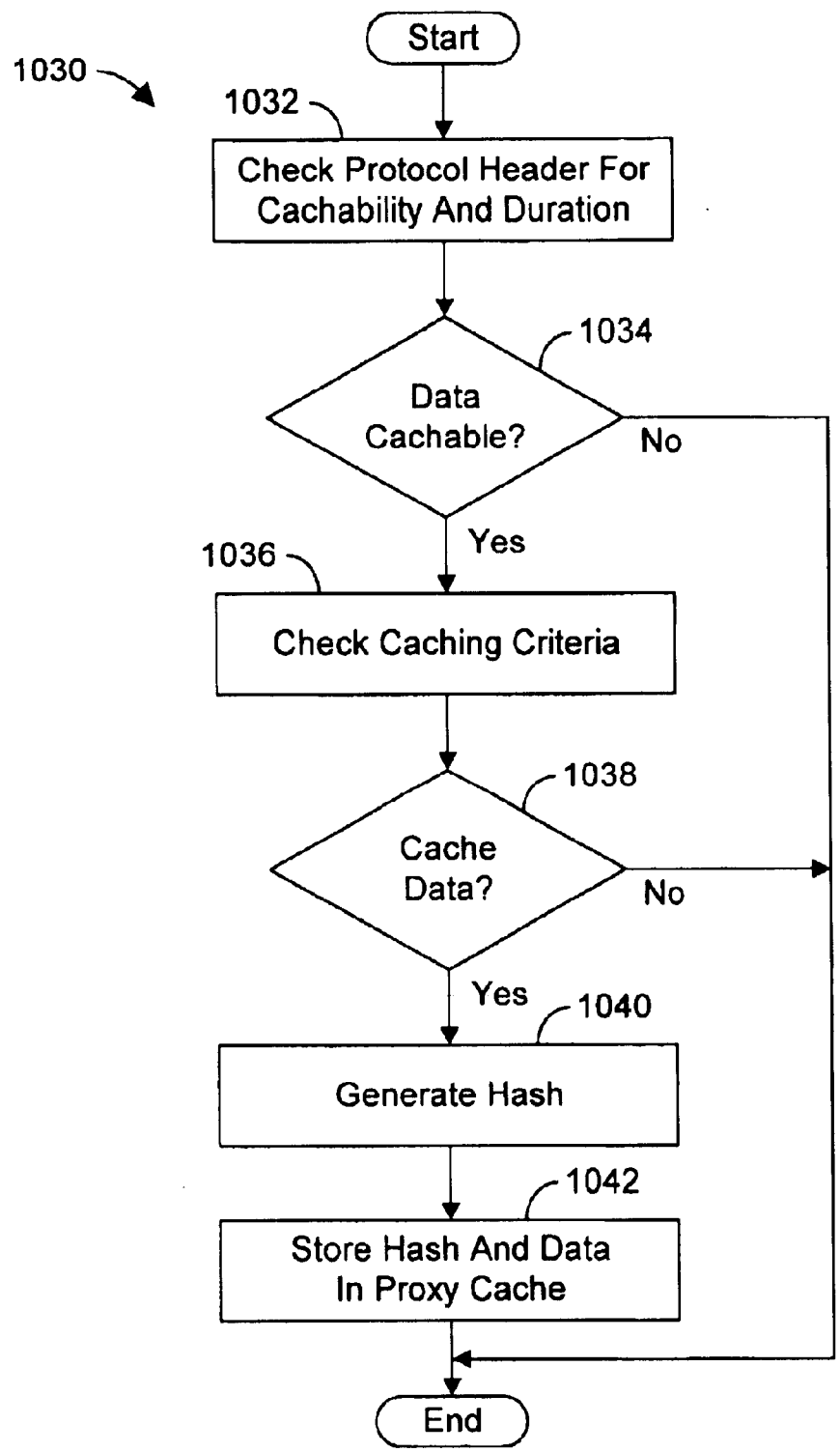
FIG. 10A is a flow chart summarizing one method for performing the seventh step of the method of FIG. 5.

FIG. 10A is a flow chart summarizing one particular method 1030 of performing seventh step 514 (copy server response to proxy cache 133) of method 500 of FIG. 5. In a first step 1032, caching proxy 208(4) reads the protocol header of the server response to determine cachability and duration of the requested data. For example, a response from server 106 that includes values calculated from unique information provided by client 109(1) would not be a good candidate for caching, because it is extremely unlikely that the same information would be provided by another of clients 109(2-n). Thus, the cached response would not be accurate. Similarly, some server responses are time sensitive and, therefore, are only useful for a short period of time. Such responses are also not good candidates for caching. Next, in a second step 1034, caching proxy 208(4) determines whether the cachability information retrieved in first step 1032 indicates that the data is cachable. If the data is not cachable, then method 1030 ends. If the data is cachable, then in a third step 1036, caching proxy 208(4) retrieves predetermined caching criteria, and in a fourth step 1038 compares the caching criteria to the header values of the server response (or other statistical data relating to the response) to determine whether the data will be copied to proxy cache 133.

Caching criteria are used to determine whether a particular response should be cached in the first instance, or whether responses already in proxy cache 133 should be removed to make room for a new response. Typical caching criteria include, but are not limited to, removing the least recently used data to make room for new data, first-in-first-out data replacement, file size weighting (you can store a greater number of small files), and request frequency weighting. If the predetermined caching criteria are not met, then method 1030 ends. If the caching criteria are met, then in a fifth step 1040 caching proxy 208(4) generates a hash value for the response data, and in a sixth step 1042 stores the response data in a record 434 of proxy cache 133 and stores the hash value and record 434 location in index map 432. After sixth step 1042, method 1030 ends.

Figure 11:
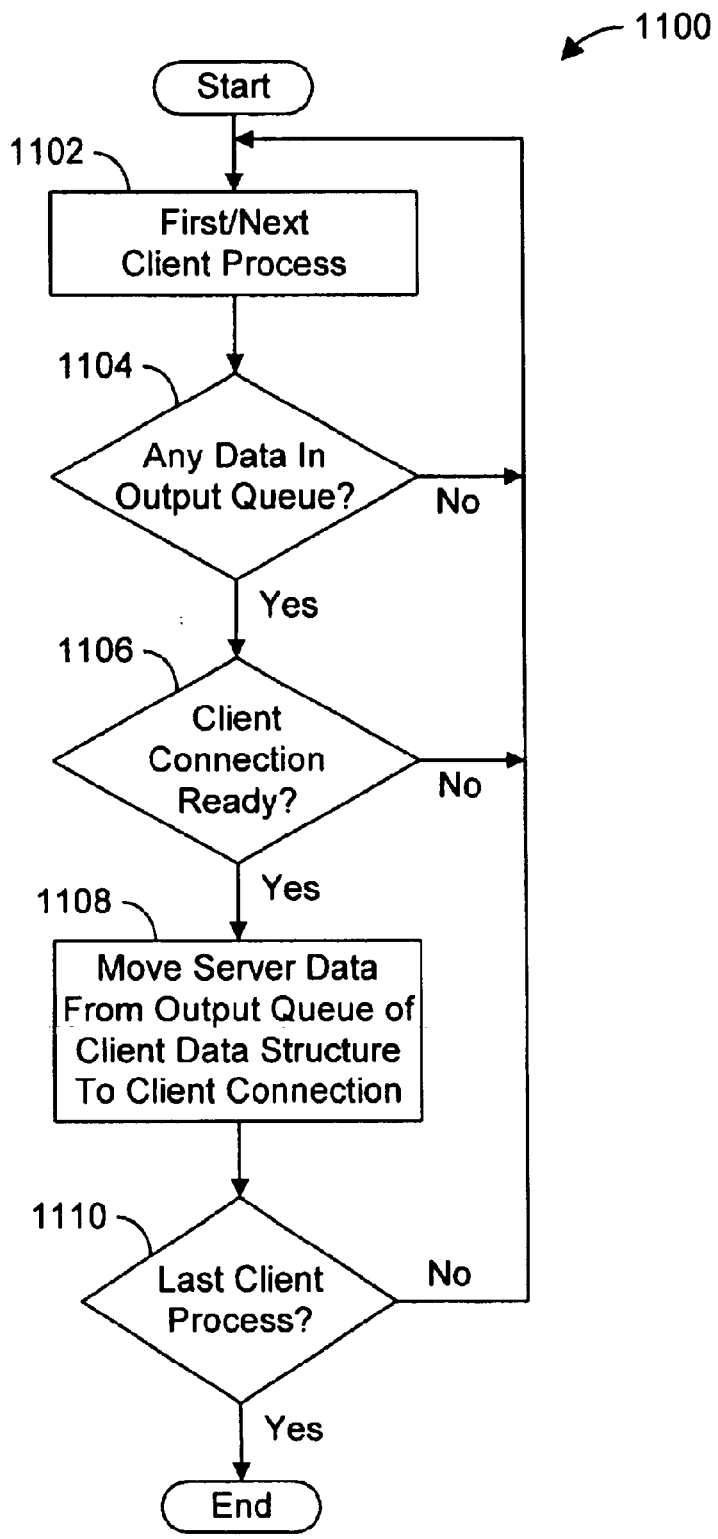
FIG. 11 is a flow chart summarizing one method for performing the eighth step of the method of FIG. 5.

FIG. 11 is a flow chart summarizing a method 1100 of performing eighth step 516 (transmitting data to clients 109) of method 500. In a first step 1102, master process 202 calls first client process 204(1). Then, in a second step 1104, first client process 204(1) determines whether there is any data in output queue 414(1) of client data structure 402(1). If there is no data in output queue 414(1), then method 1100 returns to first step 1102 where master process 202 calls the next of the remaining client processes 204(2-n). If, however, in second step 1104, client process 204(1) determines that there is data in output queue 414(1), then in a third step 1106, client process 204(1) determines whether the client network connection is ready to receive data. If the client network connection is not ready, then method 1100 returns to first step 1102. If the client network connection is ready, then in a fourth step 1108, client process 204(1) moves at least a portion of the data in output queue 414(1) to the client connection (e.g., the TCP output buffer). Next, in a fifth step 1110, master process 202 determines whether the last client process has been called. If so, method 1100 ends. If not, method 1100 returns to first step 1102 to call the next of the remaining client processes 204(2-n).

Figure 12:
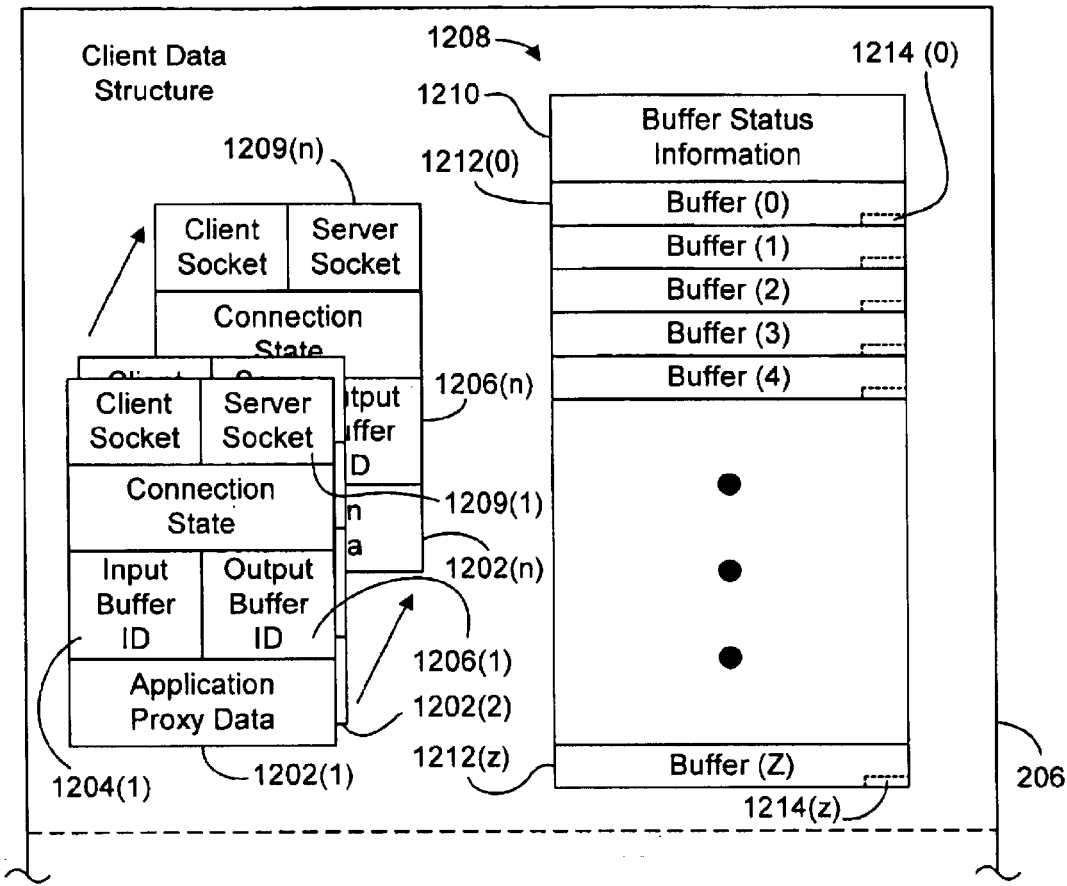
FIG. 12 is a block diagram showing an alternate client data structure and buffering scheme for at least some of the data stored in the data buffer of FIG. 2.

FIG. 12 is a block diagram showing an alternate client data structure that can be implemented in data buffer 206 to significantly increase the number of simultaneous client connections that can be maintained by proxy 132. In particular, the number of simultaneous client connections that can be maintained depends on the memory capacity of data buffer 206 available to buffer the data flowing between clients 109 and server 106. Some applications (e.g., "buddy list" applications) open client connections with a server, but rarely exchange data with the server. Other applications (e.g., web browsers) open a client connection with a server and request data (e.g., a web page) from a server, but do not close the connection after the data is received. At any given time, therefore, a large number of client connections may be open, and tying up buffer space, but not actively exchanging data with the server. Dissociating the allocation of data buffer space from the client data structure substantially increases the number of simultaneous client connections that can be open, because valuable memory space is not wasted by such idle client connections.

Dissociated client data structures 1202(1-n) are similar to client data structures 402(1-n), except that input queues 412(1-n) and output queues 414(1-n) are replaced with input buffer identifiers 1204(1-n) and output buffer identifiers 1206(1-n), respectively. Input buffer identifiers 1204 and output buffer identifiers 1206 store pointers that link the client data structures 1202 to buffers that are allocated to the particular client process 204 associated with the client data structure 1202. When master process module 202 initializes client data structures 1202(1-n), default values (e.g., all bits set to "1") are loaded into input buffer identifier 1204 and output buffer identifier 1206 to indicate that no data buffers have been allocated. Storage for the data that passes between clients 109 and server 106 is provided by a buffer pool 1208 that includes a buffer status information section 1210 and a plurality of general-purpose buffers 1212(0-Z). Buffer status section 1210 stores information relating to the allocation and use of buffers 1212(0-Z), as will be described in greater detail below. Each of buffers 1212(0-Z) is a general-purpose buffer of predetermined size (e.g., 2 KB). The terminal storage locations 1214(0-Z) of each of buffers 1212(0-Z) are reserved for pointers that facilitate the linking of two or more of buffers 1212(0-Z) to create a buffer of greater capacity.

Figure 13:
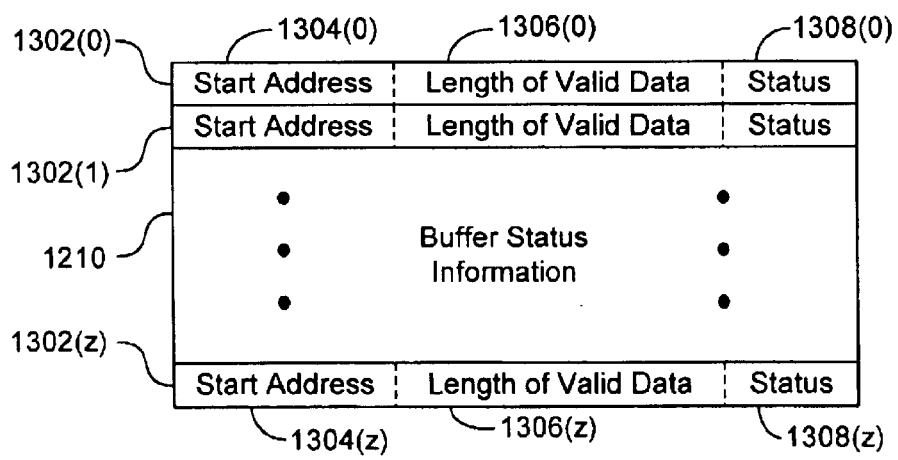
FIG. 13 is a block diagram showing the buffer status information of FIG. 12 in greater detail.

FIG. 13 is a block diagram showing buffer status information section 1210 in greater detail. Buffer status section 1210 includes a plurality of registers 1302(0-Z), each associated with a corresponding one of buffers 1212(0-Z). Each of registers 1302(0-Z) includes a start address storage location 1304(0-Z), a length of valid data storage location 1306(0-Z), and a status flag 1308(0-Z), respectively. Start address storage location 1304 stores a pointer to the beginning of the buffer 1212 associated with the particular register 1302. Length of valid data storage location 1306 stores two values, one that indicates how much data has been written into associated buffer 1212 (data written value), and one that indicates how much data has been transferred out of buffer 1212 (data read value). Status flag 1308 indicates whether or not associated buffer 1212 has been allocated to a client data structure 1202 or is available for allocation.

Figure 14:
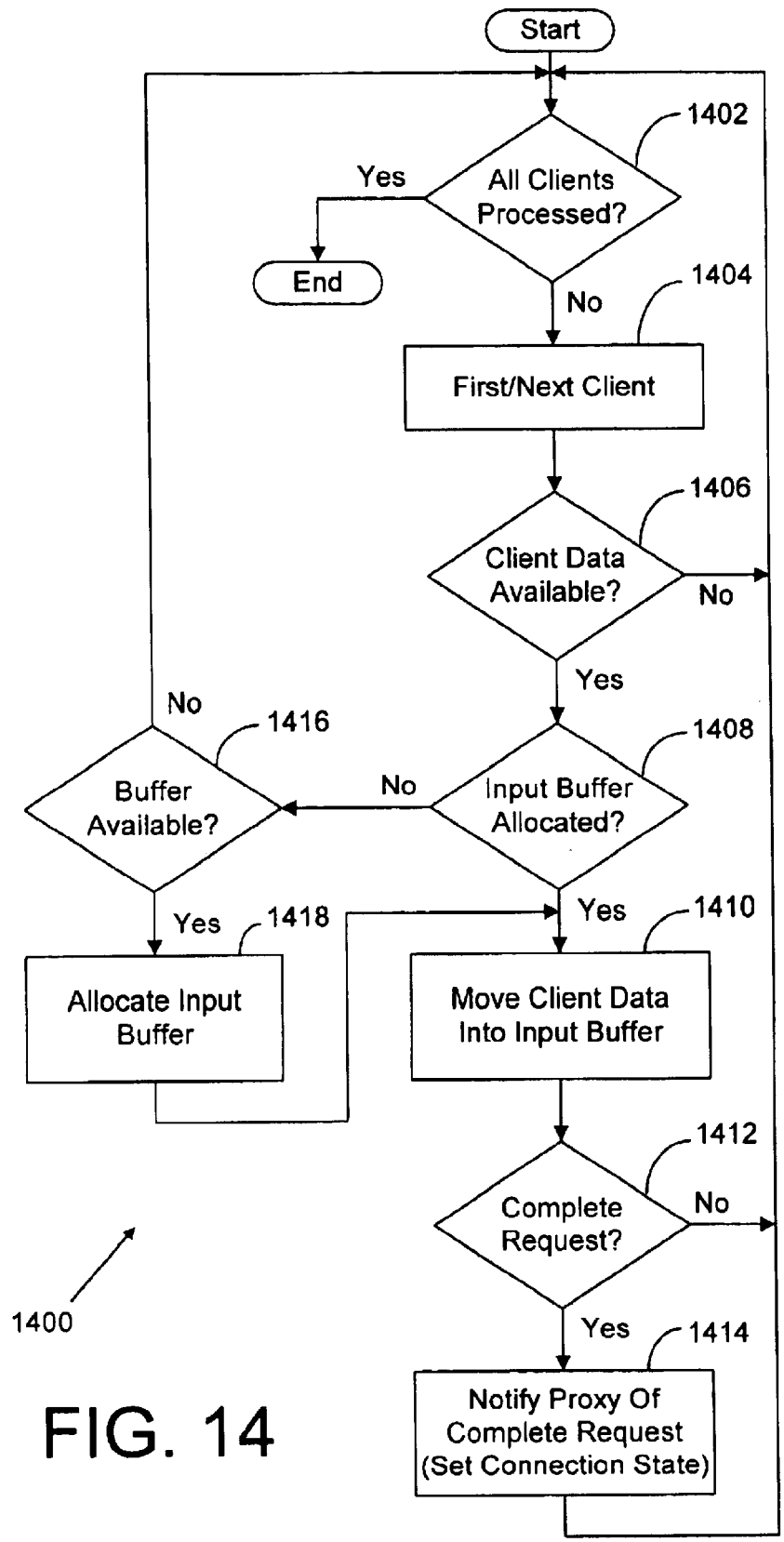
FIG. 14 is a flow chart summarizing an alternate method for performing the second step of the method of FIG. 5.

FIG. 14 is a flow chart summarizing an alternate method 1400 of performing second step 504 (receive request via client connection) of method 500, that utilizes client data structures 1202(1-n) and buffer pool 1208. In a first step 1402, master process 202 determines whether there are any client processes 204 to be processed to receive data. If master process 202 has already processed all of client processes 204(1-n), then method 1400 ends. If not, then in a second step 1404, master process 202 calls the first client process 204(1). Then, in a third step 1406, client process 204(1) checks its client connection (e.g., the TCP buffer) to determine whether there is a data request coming in from client 109(1). If there is no incoming data for the first client process 204(1), then method 1400 returns to first step 1402 to process any remaining client processes 204(2-n). If, in third step 1406, client process 204(1) determines that there is an incoming data request from client 109(1), then in a fourth step 1408, client process 204(1) checks input buffer identifier 1204(1) to determine whether one of buffers 1212(0-z) has been allocated as an input buffer to client process 204(1). If there is an input buffer allocated, then in a fifth step 1410, client process 204(1) moves the client data into the allocated input buffer. Then, in a sixth step 1412, client process 204(1) determines whether the data accumulated in the allocated input buffer constitutes a complete request (i.e., data ready to be transferred to server 106, for example a complete HTTP request). If the data does not constitute a complete request, then method 1400 returns to first step 1402 to process any remaining client processes 204(2-n). If, however, client process 204(1) determines in sixth step 1412 that the data in the input buffer constitutes a complete request, then, in a seventh step 1414, client process 204(1) notifies proxy applications 208 that there is a complete request by, for example, setting connection state 1210 (1) to so indicate. Then, method 1400 returns to first step 1402 to determine whether there are any more client processes 204(2-n) to process.

If in fourth step 1408, client process 204 determines that no input buffer has been allocated to client process 204(1), then in an eighth step 1416, client process 204(1) examines status flags 1308 of buffer status information 1210 to determine whether one of buffers 1212(0-Z) is available. If one of buffers 1212(0-Z) is available, then in a ninth step 1418, client process 204(1) allocates the available buffer 1212 to itself, by writing a pointer to the available buffer's status register 1302 into input buffer identifier 1204(1) of client data structure 1202(1), and by setting status flag 1308 in the buffer's register 1302 to indicate that the buffer has been allocated. Next, method 1400 proceeds to fifth step 1410, where client process 204(1) moves the data request into the allocated input buffer 1212.

Method 1400 is similar to method 700, except that none of the buffer resources are allocated as input buffers until it is determined that a client communication includes at least a portion of a data request. A large number of idle client connections can therefore be established and maintained without using any of the valuable buffer space. The buffer space is thus available to support the management of a substantially increased number of active (exchanging data) connections by proxy 132.

As used herein, the term "data request" is intended to mean any data sent by a client 109 and bound for server 106. The term data request should be interpreted broadly to include requests from a client 109 for data from server 106 (e.g., file download request), as well as submissions of data from a client 109 to server 106 (e.g., file upload). The term "data request" does not, however, include connection management data (e.g., connection requests). Thus, according to method 1400, client processes 204(1-n) only allocate buffers 1212(0-Z) when they are needed, as opposed to every time a client connection is opened.

Figure 14A:
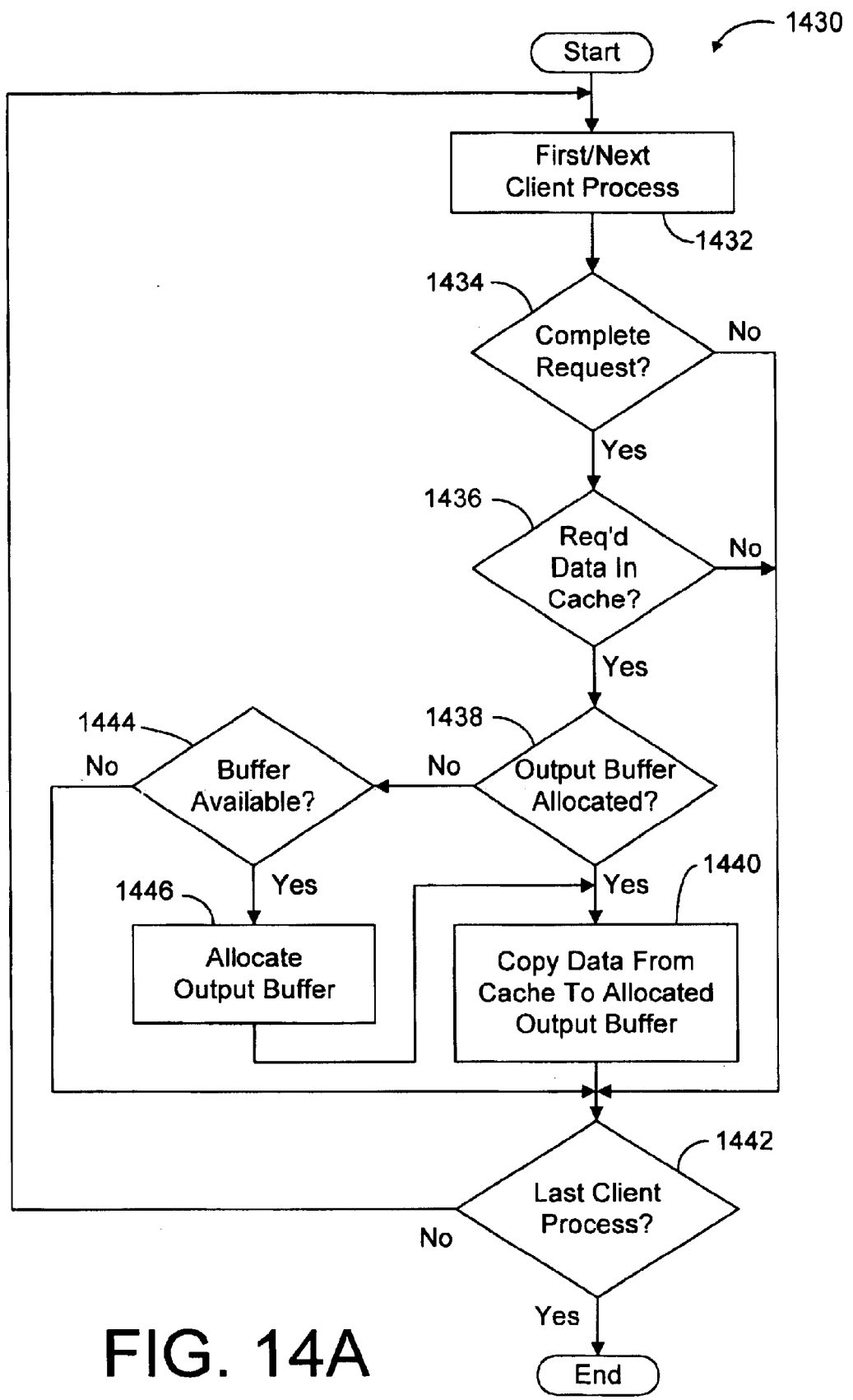
FIG. 14A is a flow chart summarizing an alternate method for performing the third step of the method of FIG. 5.

FIG. 14A is flow chart summarizing an alternate method 1430 of performing third step 506 (retrieve requested data from cache) of method 500. In a first step 1432, master process module 202 calls caching proxy 208(4), which retrieves the first client descriptor from client queue 418(4) of its proxy data structure 404(4). Then in a second step 1434, caching proxy 208(4) checks the connection state 1210 of the client data structure 1202 identified by the first client descriptor to determine if the first client has a complete request in an allocated buffer 1212. If connection state 410 indicates a complete request, then in a third step 1426, caching proxy 208(4) determines whether the requested data is stored in proxy cache 133. If the requested data is available from proxy cache 133, then in a fourth step 1438, caching proxy 208(4) checks output buffer identifier 1206 to determine whether an output buffer 1212 has been allocated to the client data structure 1202. If an output buffer 1212 has been allocated to client data structure 1202, then in a fifth step 1440, caching proxy 208(4) copies the requested data from proxy cache 133 into the allocated output buffer 1212. Next, in a sixth step 1442, caching proxy 208(4) determines whether the last client descriptor in its client queue 418(4) has been processed. If the last client has been processed, then method 1430 ends. Otherwise, method 1430 returns to first step 1432 to begin processing the next client.

If in fourth step 1438 caching proxy 208(4) determines that no buffer 1212 has been allocated to client data structure 1202, then method 1430 proceeds to a seventh step 1444 to determine whether any of buffers 1212(1-z) are available for allocation. If none of buffers 1212 are available, then method 1430 proceeds to sixth step 1442 to determine whether the last client has been processed. If one of buffers 1212 are available, then in an eighth step 1446 caching proxy 208(4) allocates one of buffers 1212 to the client data structure 1202 being processed, and proceeds to fifth step 1440 to copy the data from proxy cache 133 into the allocated buffer 1212.

Figure 15:
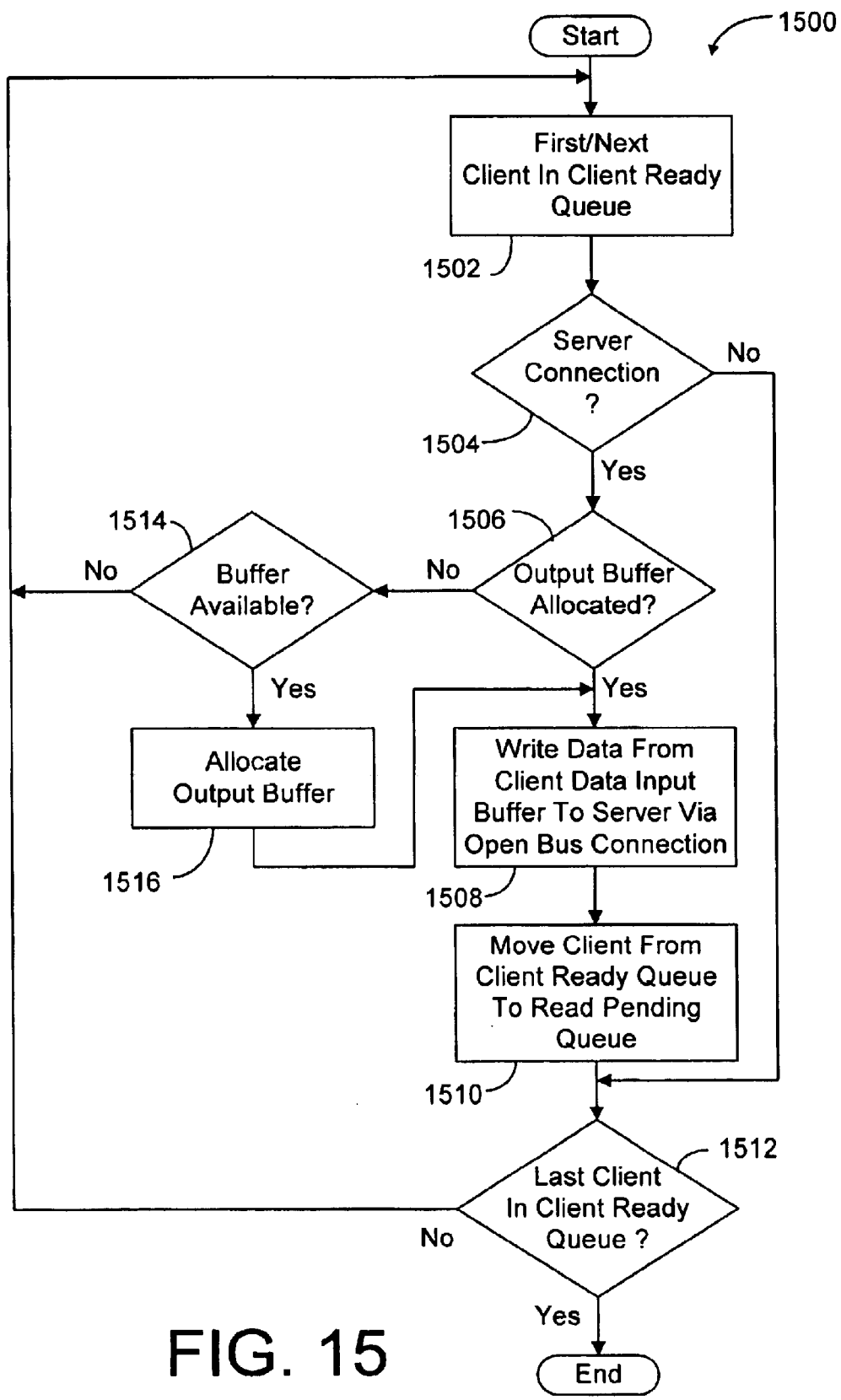
FIG. 15 is a flow chart summarizing an alternate method for performing the fifth step of the method of FIG. 5.

FIG. 15 is a flow chart summarizing an alternate method 1500 of performing fifth step 510 (forward client request to server via bus connection) of method 500. In a first step 1502, proxy 208(1) retrieves the first client descriptor from the client ready queue 420(1) of its proxy data structure 404(1). Then, in a second step 1504, proxy 208(1) checks the server socket 1209 of the first client's data structure 1202 to determine whether a server connection is open. If a server connection is open, then in a third step 1506, proxy 208(1) checks the output buffer identifier 1206 of the first client's data structure 1202 to determine whether one of buffers 1212(0-Z) has been allocated to the first client's data structure as an output buffer. If proxy 208(1) determines that an output buffer has been allocated, then in a fourth step 1508 proxy 208(1) transfers the client data request (e.g., HTTP request) from the input buffer allocated to the first client to server 106 over the open server connection. Next, in a fifth step 1510, proxy 208(1) moves the client descriptor from the client ready queue 420(1) to the read pending queue 422(1). Then in a sixth step 1512, proxy 208(1) determines whether the last client in the client ready queue 420(1) has been checked. If not, then method 1500 returns to first step 1502 to check the next client in client ready queue 420(1). If the last client has been checked, then method 1500 ends. If, in second step 1504, proxy 208(1) determines that there is no server connection open for a particular client, then method 1500 proceeds directly to sixth step 1512 to determine whether the last client in the client ready queue 420(1) has been checked. Once all of the descriptors in client ready queue 420(1) of proxy data structure 404(1) have been processed, method 1500, or a similar method, is repeated for each of the other application proxies 208(2-f).

If in third step 1506, proxy 208(1) determines that no output buffer has been allocated to the first client's data structure 1202, then in a seventh step 1514, proxy 208(1) searches the buffer status information section 1210 of buffer pool 1208 to determine if any of buffers 1212(0-Z) are available for allocation. If one of buffers 1212(0-Z) are available for allocation, then in an eighth step 1516 proxy 208(1) allocates the available one of buffers 1212(0-Z) to the first client's data structure 1202 by writing a pointer to the available buffer's status register 1302 into input buffer identifier 1204 of the first client's data structure 1202, and by setting the status flag 1308 in the buffer's status register 1302 to indicate that the buffer has been allocated. Then, method 1500 proceeds to fourth step 1508. If none of buffers 1212(0-Z) are available, then method 1500 returns to first step 1502 to process the next client in client ready queue 420(1).

Method 1500 is similar to method 900, except that buffers 1212(0-Z) are not allocated as output buffers (for storing server responses) until after a server connection is open. The particular triggering event for allocating an output buffer is not, however, considered to be an essential element of the present invention. For example, output buffers can be allocated sooner (e.g., when proxy 208 determines that a complete client request has been received in second step 804 of method 800 (FIG. 8)), or they can be allocated later (e.g., after proxy 208 determines that there is server data available in third step 1006 of method 1000 (FIG. 10)). As long as the buffers are allocated at a time when there is an increased probability that they will be used shortly after allocation, buffer efficiency is increased.

Figure 16:
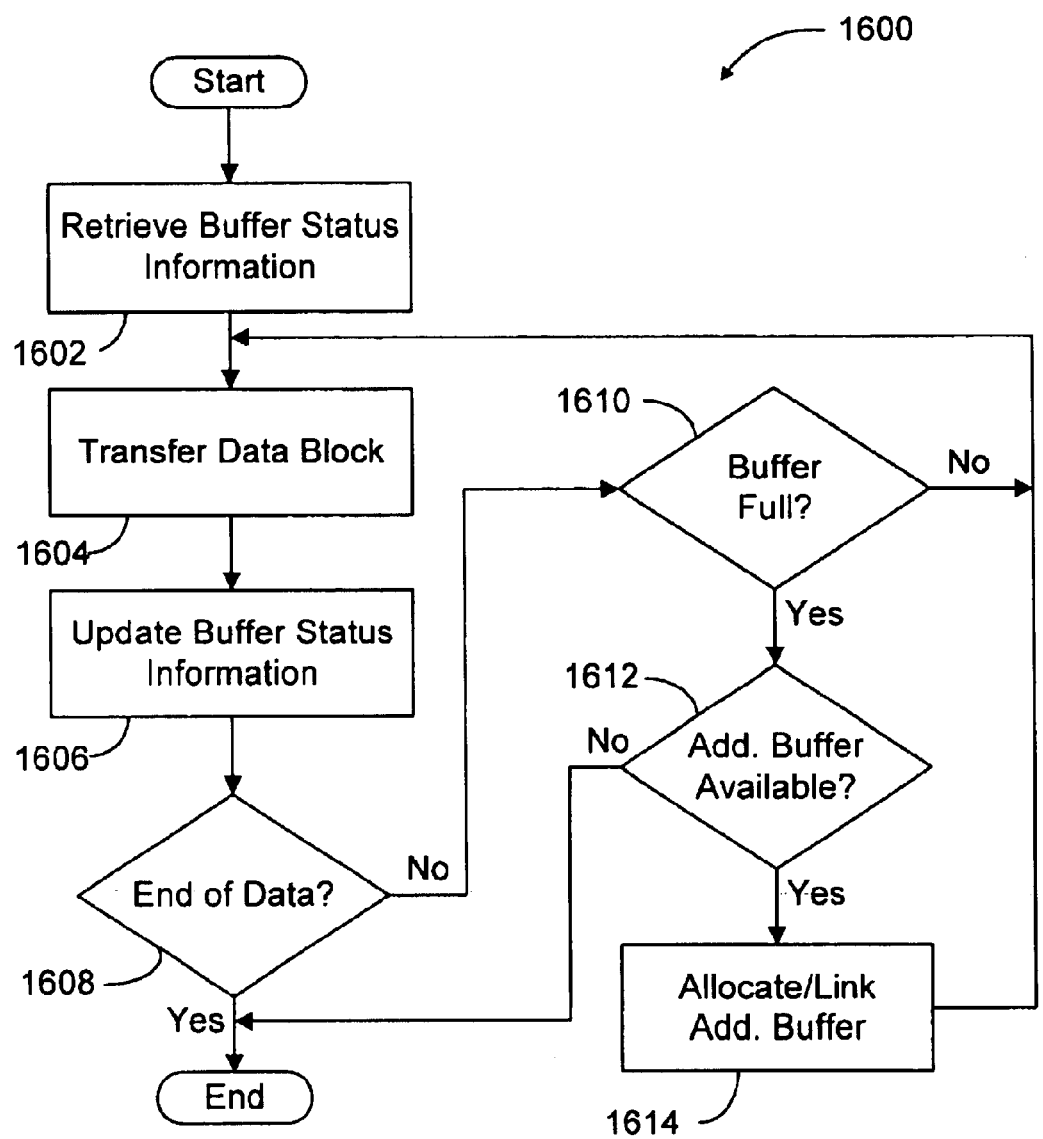
FIG. 16 is a flowchart summarizing a method for transferring data into an input buffer or an output buffer according to the present invention.

FIG. 16 is a flow chart summarizing a method 1600 for writing data to an allocated input or output buffer. Method 1600 will be described with reference to writing data to an allocated input buffer, but is equally well suited to writing server data to an output buffer. In a first step 1602, a client process (e.g., client process 204(1)) uses input buffer identifier 1204(1) to retrieve the buffer status information (the start address 1304 and the length of valid data 1306) for the allocated buffer 1212. Then, in a second step 1604, client process 204(1) transfers a first block of the available client data into the allocated buffer 1212. Client process 204(1) calculates the storage address for the block of data by adding the length of valid data 1306 (data written value) to the start address 1302 of the buffer. Then, in a third step 1606, client process 204(1) updates the buffer status information by incrementing the length of valid data 1306 (data written value) by the size of the data block written to the allocated buffer 1212. Next, in a fourth step 1608, client process 204(1) determines whether the transferred block of data included an end-of-data indicator, and if so then method 1600 ends.

If, in fourth step 1608, client process 204(1) determines that the transferred data block did not include an end-of-file indicator, then in a fifth step 1610 client process 204(1) determines whether the allocated buffer is full by comparing the updated length of valid data 1306 to the known size of buffer 1212. If the data buffer 1212 is not full, then method 1600 returns to second step 1604 to transfer the next block of data. If, however, the allocated data buffer 1212 is full, then in a sixth step 1612 client process 204(1) searches buffer status information 1210 to determine whether any of buffers 1212(0-Z) are available. If there are no unallocated buffers in buffer pool 1208, then method 1600 ends, but if client process 204(1) finds an unallocated buffer in buffer pool 1208, then in a seventh step 1614 client process 204(1) links the unallocated buffer to the previously allocated input buffer. Client process 204(1) links the buffers by storing a pointer to the status register 1302 of the second allocated buffer in the last position 1214 of the first buffer, updating the length of valid data 1306, and setting the status flag 1308 in the status register 1302 of the new buffer to indicate that the new buffer is allocated. After linking the input buffers in seventh step 1614, method 1600 returns to second step 1604 to transfer the next block of data. Method 1600 continues until either all of the available data is written to the input buffer, or until all of buffers 1212(0-Z) are allocated.

Figure 17:
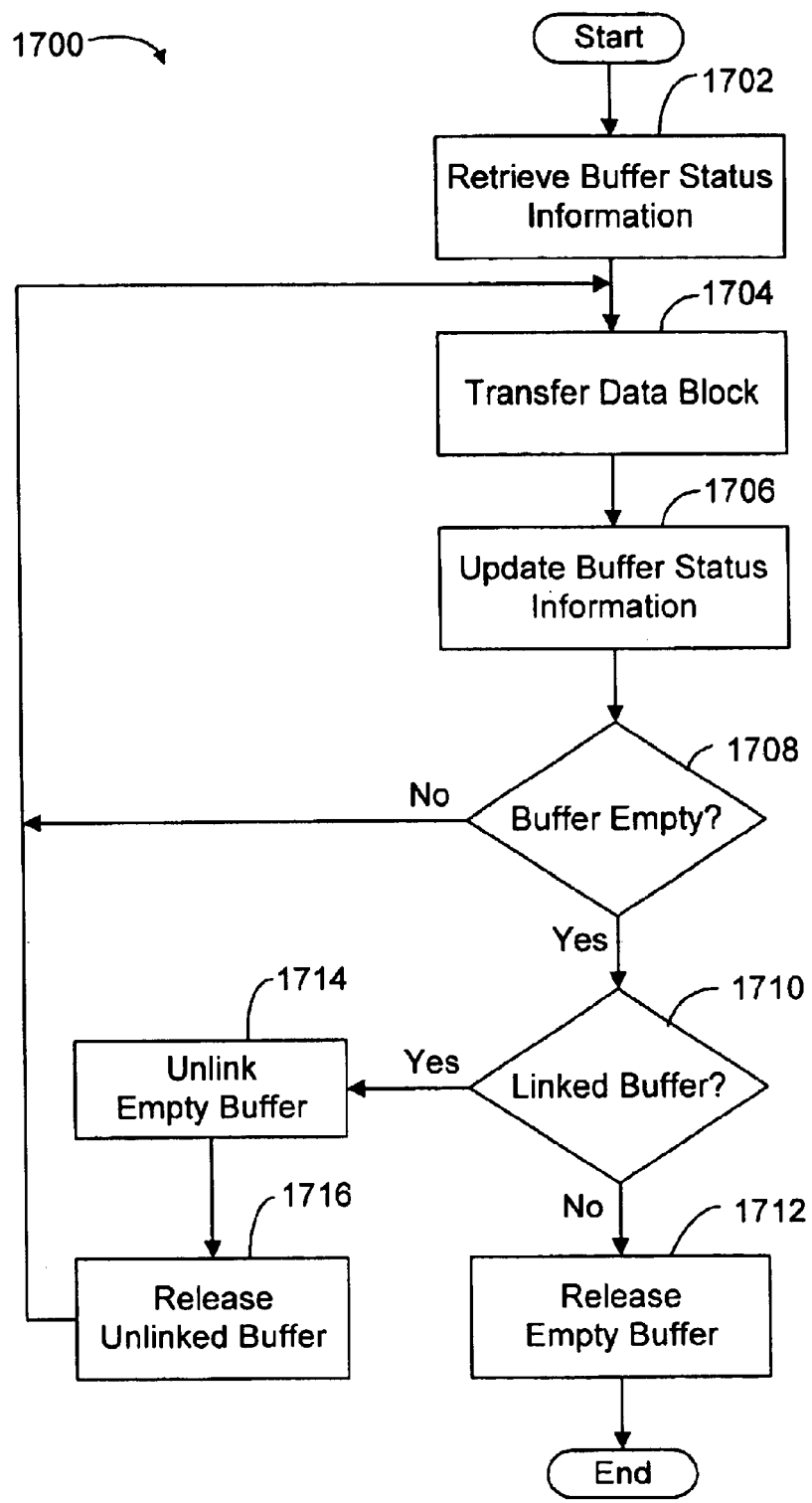
FIG. 17 is a flowchart summarizing a method for transferring data out of an input buffer or an output buffer according to the present invention.

FIG. 17 is a flow chart summarizing a method 1700 of transferring data out of an allocated input or output buffer. Method 1700 is described with reference to transferring server data out of an allocated output buffer, but is equally well suited for transferring client data out of an input buffer. In a first step 1702, a client process 204 uses output buffer identifier 1206(1) to retrieve the buffer status information for the allocated output buffer 1212. Then, in a second step 1704, client process 204 transfers a first block of the stored server data out of the allocated output buffer 1212 to the client 109. In a third step 1706, client process 204 updates the buffer status information 1210 by incrementing the data read value of valid data 1306 by the size of the data block transferred. Next, in a fourth step 1708 client process 204 determines whether the output buffer is empty, by comparing the data written and data read values of the length of valid data 1306. If the data read value is equal to the data written value or the size of buffer 1212, then buffer 1212 is empty. If buffer 1212 is empty, then in a fifth step 1710 client process 204 determines whether the empty buffer is linked to any additional buffers 1212. If the data written value of the length of valid data 1306 is smaller than the known size of buffers 1212, then there are no linked buffers. If there are no linked buffers, then in a sixth step 1712, client process 204 releases buffer 1212, by changing its status flag 1308 to indicate that it is unallocated and resetting the length of valid data values 1306, and then method 1700 ends.

If in fifth step 1710 client process 204 determines that the empty buffer is linked to an additional buffer, then in a seventh step 1714 client process 204 unlinks the empty buffer from any buffers still containing data as follows. First, client process 204 copies the pointer from the terminal location 1214 of the empty buffer into the output buffer identifier 1206 of the client data structure 1202. The copied pointer points to the status register 1302 of the next linked buffer, instead of the status register of the emptied buffer. Next, client process 204 copies the length of valid data values 1306 from the status register 1302 of the empty buffer into the status register 1302 of the next linked buffer, and then decrements both the data written and the data read values by an amount equal to the capacity of one buffer 1212. After unlinking the buffers, client process 204 releases the empty buffer, in an eighth step 1716, as described above with respect to sixth step 1712. After the empty buffer is released in eighth step 1716, method 1700 returns to second step 1704 to begin transferring data out of the next linked buffer.

The description of particular embodiments of the present invention is now complete. Many of the described features may be substituted, altered or omitted without departing from the scope of the invention. For example, the operative components of adapter 108 (e.g., processing unit 126 and proxy 132) can be incorporated directly into a server instead of being provided in a removable adapter card. Further, alternate data structures may be substituted for the exemplary data structures provided. Additionally, the particular orders of methods and routines disclosed herein are not considered to be essential elements of the present invention. As yet another example, master process 202 can be configured to open a predetermined number of persistent bus connections with server 106 at start-up, and manage the use of those connections by application proxies 208(1-f), thus eliminating the need for server 106 to repetitively open and close the bus connections. These and other deviations from the particular embodiments shown will be apparent to those skilled in the art, particularly in view of the foregoing disclosure.

We claim:

1. In an interface device operatively coupled to an internal bus of an origin servers, a method for managing connections between at least one client and said origin server, via said interface device, said method comprising:
    establishing a network connection with one of said clients via a network;
    receiving a communication from said client via said network connection;
    establishing a bus connection with said origin server via said internal bus of said origin server;
    forwarding said client communication to said origin server via said bus connection;
    receiving a response to said client communication from said origin server via said bus connection;
    forwarding said response to said client via said network connection; and
    storing at least a portion of said response in a cache;
    whereby said response can be retrieved from said cache without accessing said origin server.

2. A method according to claim 1, further comprising:
    establishing a network connection with a second one of said clients via said network;
    receiving a communication from said second one of said clients via said network connection;
    retrieving said response from said cache; and
    forwarding said cached response to said second one of said clients via said network connection.

3. A method according to claim 2, further comprising:
    determining whether said response retrieved from said cache is still valid; and wherein
    said step of forwarding said response to said second one of said clients includes forwarding said response only if it is determined that said cached response is still valid.

4. A method according to claim 3, further comprising:
    removing said response from said cache if it is determined that said response is no longer valid;
    establishing a bus connection with said origin server via said internal bus of said origin server; and
    forwarding said client communication from said second one of said clients to said origin server via said bus connection.

5. A method according to claim 1, wherein said step of storing at least a portion of said response in a cache includes:
    comparing said response to predetermined caching criteria; and
    storing said response in said cache only if said caching criteria are met.

6. A method according to claim 5, further comprising removing a least recently used response from said cache to make room for said response being stored in said cache.

7. A method according to claim 5, further comprising using a frequency weighting routine to remove a previously stored response to make room for said response being stored in said cache.

8. A method according to claim 1, wherein said step of receiving said response from said origin server includes terminating said bus connection after said response is received.

9. A method according to claim 1, wherein:
    said client communication includes an HTTP request; and
    said response includes an HTML page.

10. A computer-readable medium having code embodied therein for causing an electronic device to perform the steps of claim 1.

11. A computer-readable medium having code embodied therein for causing an electronic device to perform the steps of claim 8.

12. A computer-readable medium having code embodied therein for causing an electronic device to perform the steps of claim 2.

13. A computer-readable medium having code embodied therein for causing an electronic device to perform the steps of claim 3.

14. A computer-readable medium having code embodied therein for causing an electronic device to perform the steps of claim 4.

15. A computer-readable medium having code embodied therein for causing an electronic device to perform the steps of claim 5.

16. A computer-readable medium having code embodied therein for causing an electronic device to perform the steps of claim 6.

17. A computer-readable medium having code embodied therein for causing an electronic device to perform the steps of claim 7.

18. A computer-readable medium having code embodied therein for causing an electronic device to perform the steps of claim 9.

19. An adapter card for operatively coupling to an internal bus of an origin server for managing origin server communication with a network, said adapter card comprising:
    a network controller for communicating with clients on said network;

a memory device for storing data and code, said code including a reverse proxy application;

a processing unit coupled to said memory device for executing said code;

a protocol adapter coupled to said processing unit, and adapted to couple to said internal bus, for communicating with said origin server; and a cache memory for use by said proxy application in storing responses received from said origin server on behalf of said clients.

20. An adapter card according to claim 19, wherein said cache memory is embodied in said memory device.

21. An adapter card according to claim 20, wherein said proxy application responsive to receiving a data request from one of said clients on behalf of said origin server is operative to determine whether the requested data is stored in said cache memory.

22. An adapter card according to claim 21, wherein said proxy application responsive to determining that said requested data is stored in said cache memory is operative to determine whether said requested data is valid.

23. An adapter card according to claim 22, wherein said proxy application responsive to determining that said requested data in said cache memory is invalid is operative to remove said requested data from said cache memory, and to forward said data request to said origin server.

24. An adapter card according to claim 22, wherein said proxy application responsive to determining that said requested data in said cache memory is valid is operative to retrieve said requested data from said cache memory, and to forward said data to said client.

25. An adapter card according to claim 19, wherein said proxy application responsive to receiving requested data from said origin server on behalf of one of said clients is operative to selectively store at least a portion of said response in said cache memory.

26. An adapter card according to claim 25, wherein said proxy application is further operative to compare said requested data to predetermined caching criteria and to store said data in said cache memory only if said caching criteria are met.

27. An adapter card according to claim 26, wherein said proxy application is further operative to remove the least recently used data from said cache memory to make room for said data being stored.

28. An adapter card according to claim 26, wherein said proxy application is further operative to employ a frequency weighting routine to remove data from said cache memory to make room for said data being stored.

29. An adapter card according to claim 21, wherein said proxy application responsive to determining that said requested data is not stored in said cache memory is operative to forward said data request to said origin server.

30. An adapter card according to claim 21, wherein said proxy application responsive to determining that said requested data is stored in said cache memory is operative to retrieve said requested data from said cache memory, and to forward said data to said client.

31. An adapter card according to claim 19, wherein said proxy application is operative to receive HTTP requests from said clients on behalf of said origin server, to receive HTML pages from said origin server on behalf of said clients, to store at least some of said HTML pages in said cache memory, and to provide said stored HTML pages responsive to subsequent HTTP requests from said clients.

* * * * *